United States Patent
Amikura

(10) Patent No.: US 9,383,950 B2
(45) Date of Patent: Jul. 5, 2016

(54) INFORMATION PROCESSING SYSTEM, INFORMATION PROCESSING APPARATUS, AND PROCESS EXECUTION METHOD

(71) Applicant: Tomoya Amikura, Tokyo (JP)

(72) Inventor: Tomoya Amikura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 165 days.

(21) Appl. No.: 14/148,923

(22) Filed: Jan. 7, 2014

(65) Prior Publication Data
US 2014/0201759 A1    Jul. 17, 2014

(30) Foreign Application Priority Data

Jan. 11, 2013  (JP) .................................. 2013-003182
Oct. 17, 2013  (JP) .................................. 2013-216166

(51) Int. Cl.
| | | |
|---|---|---|
| G06F 9/44 | (2006.01) | |
| G06F 9/45 | (2006.01) | |
| G06F 3/12 | (2006.01) | |

(52) U.S. Cl.
CPC ............ *G06F 3/1206* (2013.01); *G06F 3/1213* (2013.01); *G06F 3/1241* (2013.01); *G06F 3/1247* (2013.01); *G06F 3/1288* (2013.01); *G06F 8/10* (2013.01); *G06F 8/20* (2013.01); *G06F 8/71* (2013.01)

(58) Field of Classification Search
CPC ............... G06F 8/10; G06F 8/20; G06F 8/71; G06F 8/442; G06F 8/445
See application file for complete search history.

(56) References Cited

U.S. PATENT DOCUMENTS

| | | | | |
|---|---|---|---|---|
| 6,816,276 B2 * | 11/2004 | Sugano | ........................ | 358/1.15 |
| 8,438,567 B2 | 5/2013 | Matsushima | | |
| 8,970,876 B2 * | 3/2015 | Takahashi | ............. | G06F 9/5027 358/1.15 |
| 9,086,831 B2 * | 7/2015 | Yamamoto | ............ | G06F 3/1268 |
| 9,092,703 B2 * | 7/2015 | Kamoi | ................... | G06K 15/02 |

(Continued)

FOREIGN PATENT DOCUMENTS

| | | |
|---|---|---|
| JP | 2009-134695 | 6/2009 |
| JP | 2011-192250 | 9/2011 |

(Continued)

OTHER PUBLICATIONS

Zhu et al., "SmartPrint: A Cloud Print System for Office", 2013 IEEE, Dec. 2013, pp. 95-100; <http://ieeexplore.ieee.org/stamp/stamp.jsp?tp=&arnumber=6726315>.*

(Continued)

*Primary Examiner* — Thuy Dao
*Assistant Examiner* — Ben C Wang
(74) *Attorney, Agent, or Firm* — IPUSA, PLLC

(57) ABSTRACT

An information processing system includes a managing unit that sorts a process execution request based on a type of process of the process execution request; a storing unit that stores the sorted process execution request according to the type of process of the process execution request; and a plurality of executing units that are configured to execute a process corresponding to the process execution request stored in the storing unit. At least one executing unit of the plurality of executing units is configured to split the process corresponding to the process execution request stored in the storing unit into a plurality of processes to be executed by at least two other executing units of the plurality of executing units and store in the storing unit a split process execution request including the split processes for prompting the other executing units to cooperatively execute the split processes.

11 Claims, 33 Drawing Sheets

(56) References Cited

U.S. PATENT DOCUMENTS

| | | | |
|---|---|---|---|
| 2004/0196496 A1* | 10/2004 | Klassen | 358/1.15 |
| 2005/0114287 A1* | 5/2005 | Hoberman | G06F 8/20 |
| | | | 707/999.001 |
| 2006/0082813 A1* | 4/2006 | Martin et al. | 358/1.15 |
| 2008/0168431 A1* | 7/2008 | Ito | G06F 8/443 |
| | | | 717/154 |
| 2010/0277757 A1* | 11/2010 | Smith | 358/1.15 |
| 2011/0205586 A1 | 8/2011 | Takahashi et al. | |
| 2011/0299112 A1 | 12/2011 | Ota | |
| 2012/0054112 A1* | 3/2012 | Gormish et al. | 705/301 |
| 2012/0254204 A1* | 10/2012 | Pryor-Miller et al. | 707/756 |
| 2013/0198211 A1* | 8/2013 | Kohkaki | G06F 17/30569 |
| | | | 707/756 |
| 2013/0198620 A1* | 8/2013 | Zhou et al. | 715/255 |
| 2013/0235418 A1* | 9/2013 | Tanaka | 358/1.15 |
| 2013/0258375 A1* | 10/2013 | Morgana et al. | 358/1.13 |
| 2014/0176992 A1* | 6/2014 | Shi | G06F 3/126 |
| | | | 358/1.15 |
| 2014/0340717 A1* | 11/2014 | Meiyappan | 358/400 |
| 2015/0055176 A1* | 2/2015 | Ochi | 358/1.15 |
| 2015/0067512 A1* | 3/2015 | Roswell | 715/716 |
| 2015/0092233 A1* | 4/2015 | Park et al. | 358/1.15 |
| 2015/0248258 A1* | 9/2015 | Ding | G06F 3/1222 |
| | | | 358/1.15 |

FOREIGN PATENT DOCUMENTS

| | | |
|---|---|---|
| JP | 2011-253337 | 12/2011 |
| JP | 2013-178748 | 9/2013 |

OTHER PUBLICATIONS

Bajcsy et al., "A Framework for Understanding File Format Conversions", 2010 ACM, US-DPIF'10, Mar. 2010, pp. 1-7; <http://dl.acm.org/citation.cfm?id=2039284&CFID=592844921&CFTOKEN=67117147>.*

Watanabe et al., "Mobile and Cloud Printing for Android-based Device", Oki Technical Review, Nov. 2013, Issue 222 vol. 80 No. 2, pp. 1-4; <https://www.oki.com/en/otr/2013/n222/pdf/otr-222-R07.pdf>.*

* cited by examiner

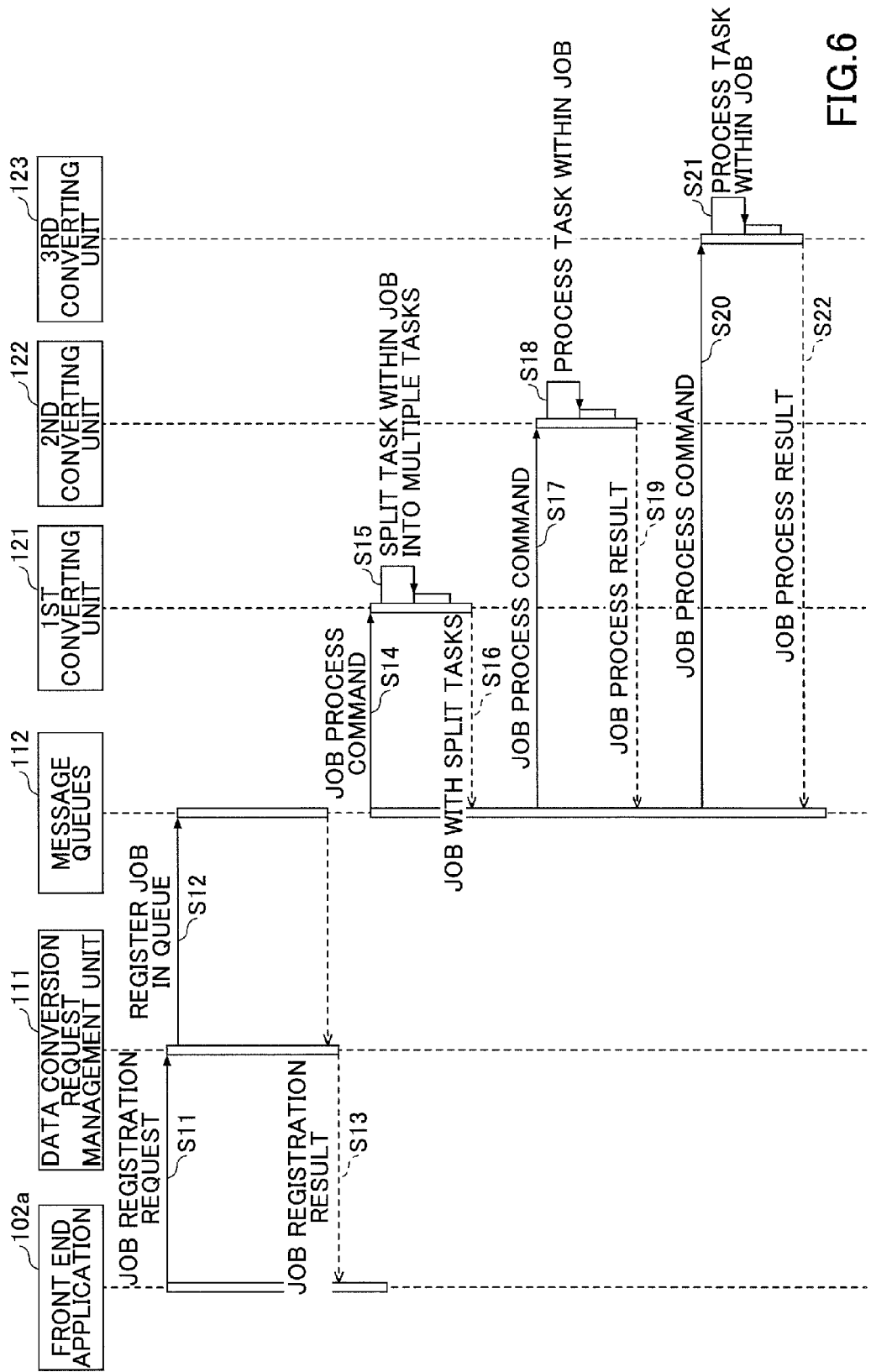

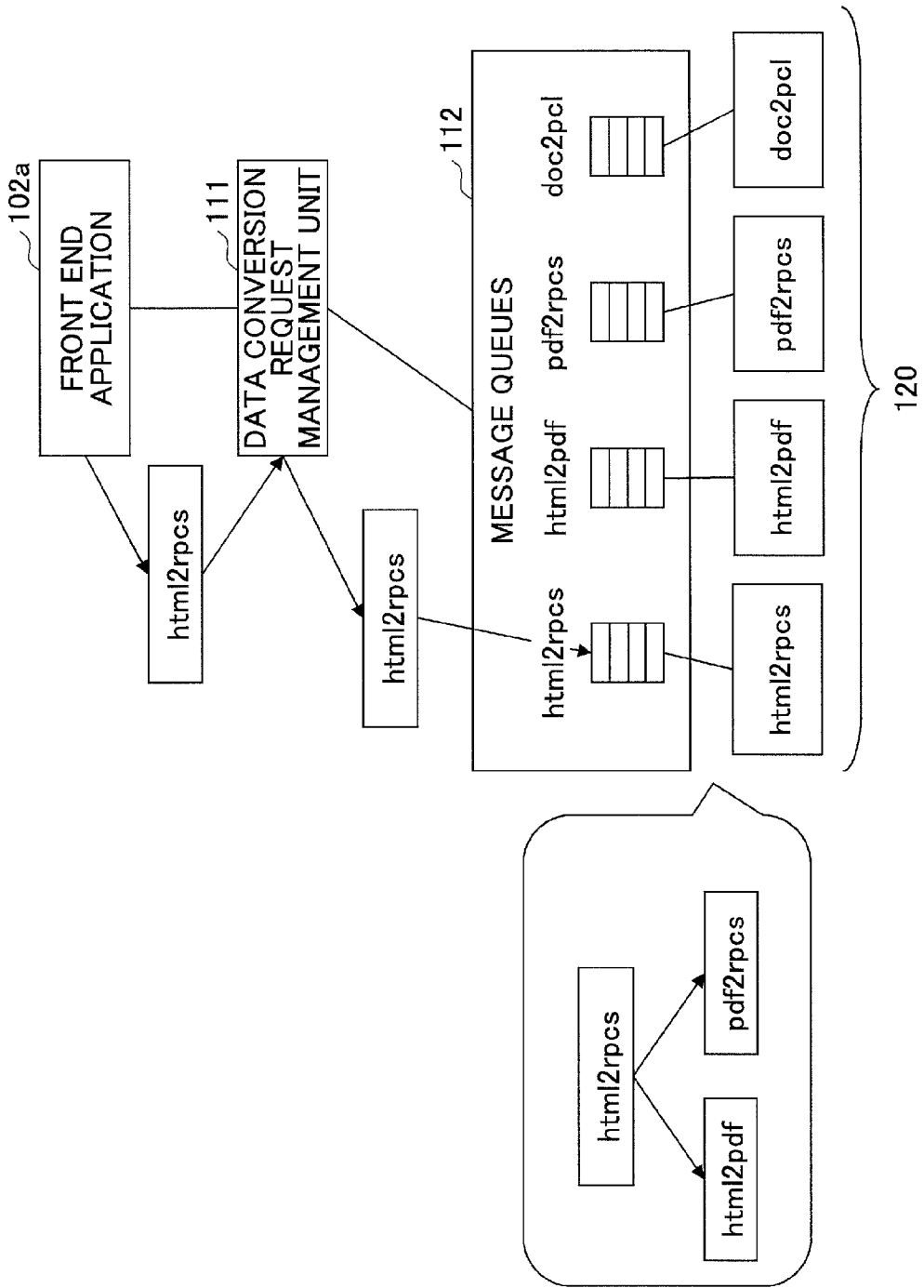

FIG.8A

```
{
 "app_id": "test",
 "tasks": [
  {
    "type": "html2rpcs",
    "params": {
       "file": "http://hoge.com/hogeapp/sample.html",
       "paper_size": "A4",
    }
  }
 ]
}
```

FIG.8B

```
{
 "app_id": "test",
 "tasks": [
  {
    "type":"html2pdf",
    "params":{
       "file": "http://hoge.com/hogeapp/sample.html",
       "paper_size": "A4",
    }
  },
  {
    "type":"pdf2rpcs",
    "params":{
       "file": "$1.file",
       "paper_size": "A4",
    }
  }
 ]
}
```

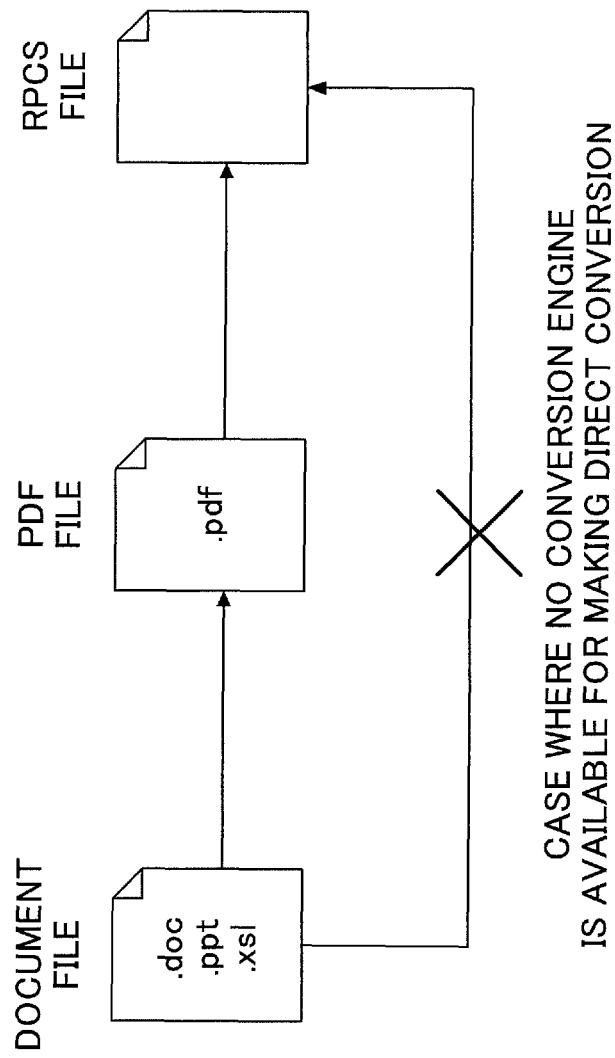

INPUT END APPARATUS

FIG.19

| ORGANIZATION CODE | ORGANIZATION NAME | COUNTRY | LANGUAGE | ADDRESS INFORMATION | ... |
|---|---|---|---|---|---|
| XXX | COMPANY A | JAPAN | JAPANESE | CompanyA@print.com | |
| YYY | COMPANY B | U.S.A. | ENGLISH | CompanyB@print.com | |

FIG.20

| ORGANIZATION CODE | USER NAME | PASSWORD | ADDRESS INFORMATION | ... |
|---|---|---|---|---|
| XXX | User A | AAA | A@aaa.com | |
| | User B | BBB | B@aaa.com | |
| | User C | CCC | C@aaa.com | |
| YYY | User A | AAA | A@bbb.com | |
| | User D | DDD | D@bbb.com | |

FIG.21

| ORGANIZATION CODE | DEVICE AUTHENTICATION INFORMATION | OFFICE INFORMATION | CAPABILITY | ... |
|---|---|---|---|---|
| XXX | 111 | OFFICE A | A4 COLOR | |
| | 222 | OFFICE B | A2 COLOR | |
| | 333 | OFFICE B | A4 BLACK & WHITE | |
| YYY | 444 | — | A4 COLOR | |

FIG.27

(1) When Worker (img2rpcs) acquires own job,
    virtual task queue state = 1 task "img2rpcs"

Task Queue 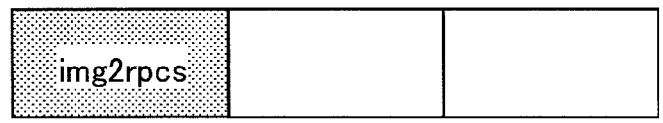

(2) Worker (img2rpcs) adds new task required for own conversion.
    Task queue includes 2 tasks "img2rpcs" "img2pdf"
    and "pdf2rpcs"

Task Queue 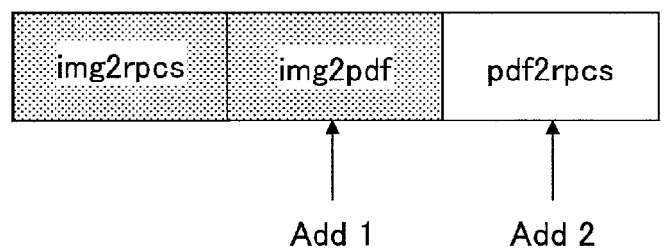

(3) Worker (img2rpcs) checks first task and
    dequeues job.

(4) Worker (img2rpcs) deletes own task after adding tasks.
    Task queue includes 2 tasks "img2pdf" and "pdf2rpcs"

Task Queue 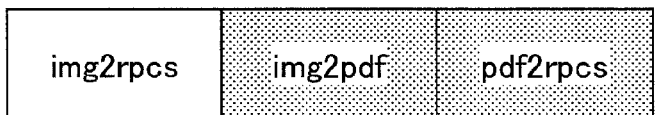

Task Queue 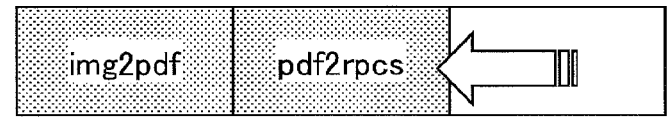

(5) Worker (img2rpcs) checks first task and enqueues job into
    corresponding queue.

FIG.28

- Status = doing
- Task
    - Conversion Type = img2rpcs
    - File = A.jpg of Data Storage
- Task Execution Result
    - Conversion Type = img2rpcs
    - Result
        - Character string indicating task has been split

FIG.29

(1) When Worker (img2pdf) acquires own job,
task queue state = 2 tasks "img2pdf" and "pdf2rpcs"

Task Queue 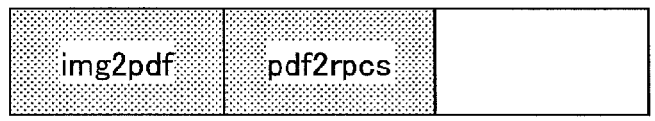

(2) Worker (img2pdf) checks first task and
 **acquires file,
 opens file,
 converts file,
 uploads file,
 and dequeues job.**

(3) Worker (img2pdf) deletes own task.
Task queue includes 1 task "pdf2rpcs"

Task Queue 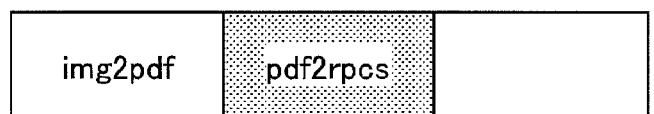

Delete

Task Queue 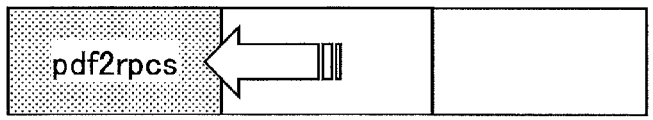

(4) Worker (img2pdf) checks first task and enqueues job
into corresponding queue.

FIG.30

- Status = doing
- Task
  - Conversion Type = img2rpcs
  - File = A.jpg of Data Storage
- Task Execution Result
  - Conversion Type = img2rpcs
  - File = A.jpg
  - Result
    - Converted File = A.pdf of Data Storage

FIG.31
(1) When Worker (pdf2rpcs) acquires own job,
task queue state = 1 task "pdf2rpcs"
Task Queue 
(2) Worker (pdf2rpcs) checks first task and
      acquires file,
      opens file,
      converts file,
      uploads file,
      and dequeues job.
(3) Worker (pdf2rpcs) deletes own task.
Task queue becomes empty.
Task Queue 
Delete
Task Queue 

FIG.32

- Status = done
- Task
  - Conversion Type = img2rpcs
  - File = A.jpg of Data Storage
- Task Execution Result
  - Conversion Type = img2rpcs
  - File = A.jpg of Data Storage, A.pdf of Data Storage
  - Result
    - Converted File = A.rpcs of Data Storage

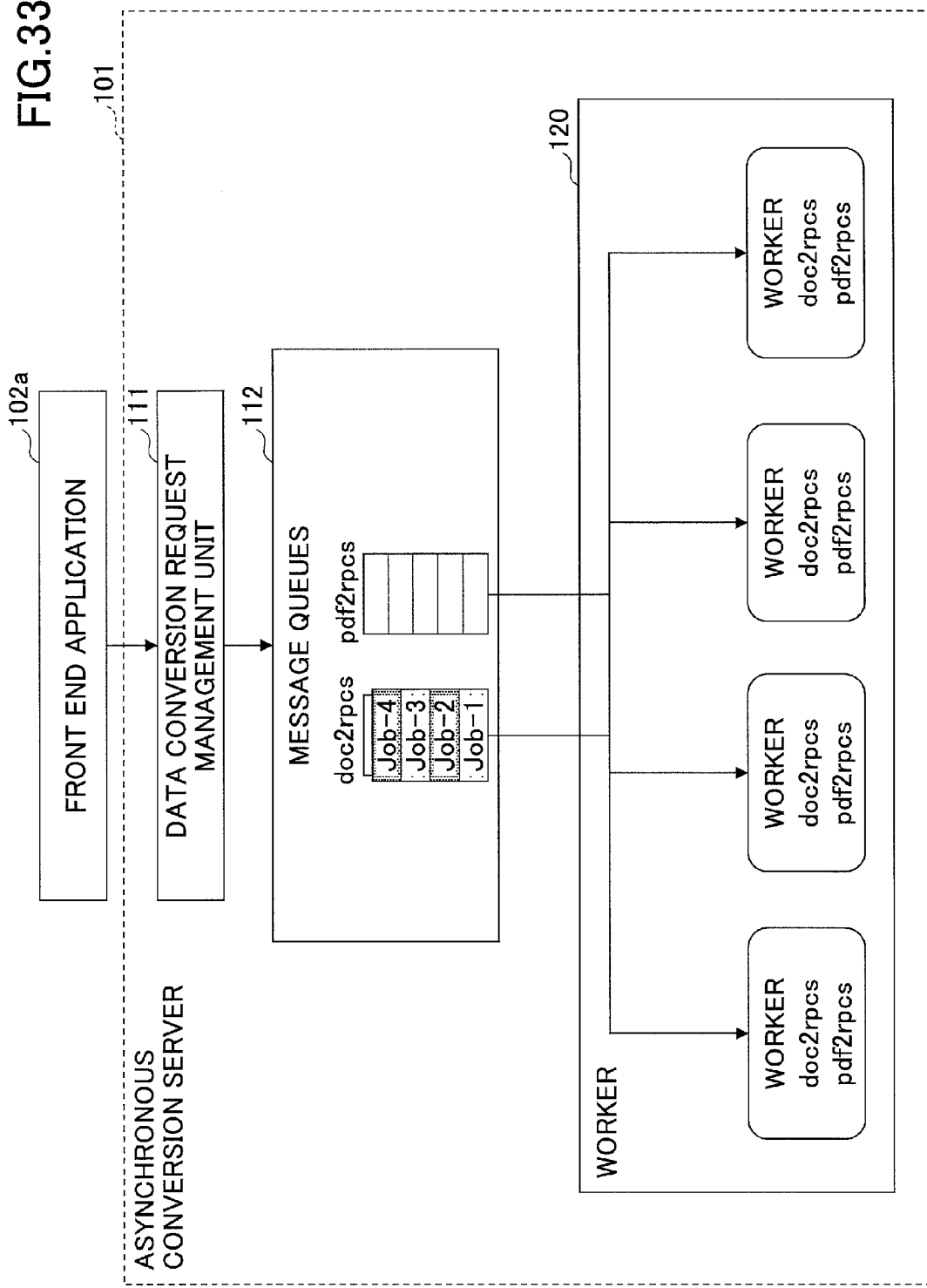

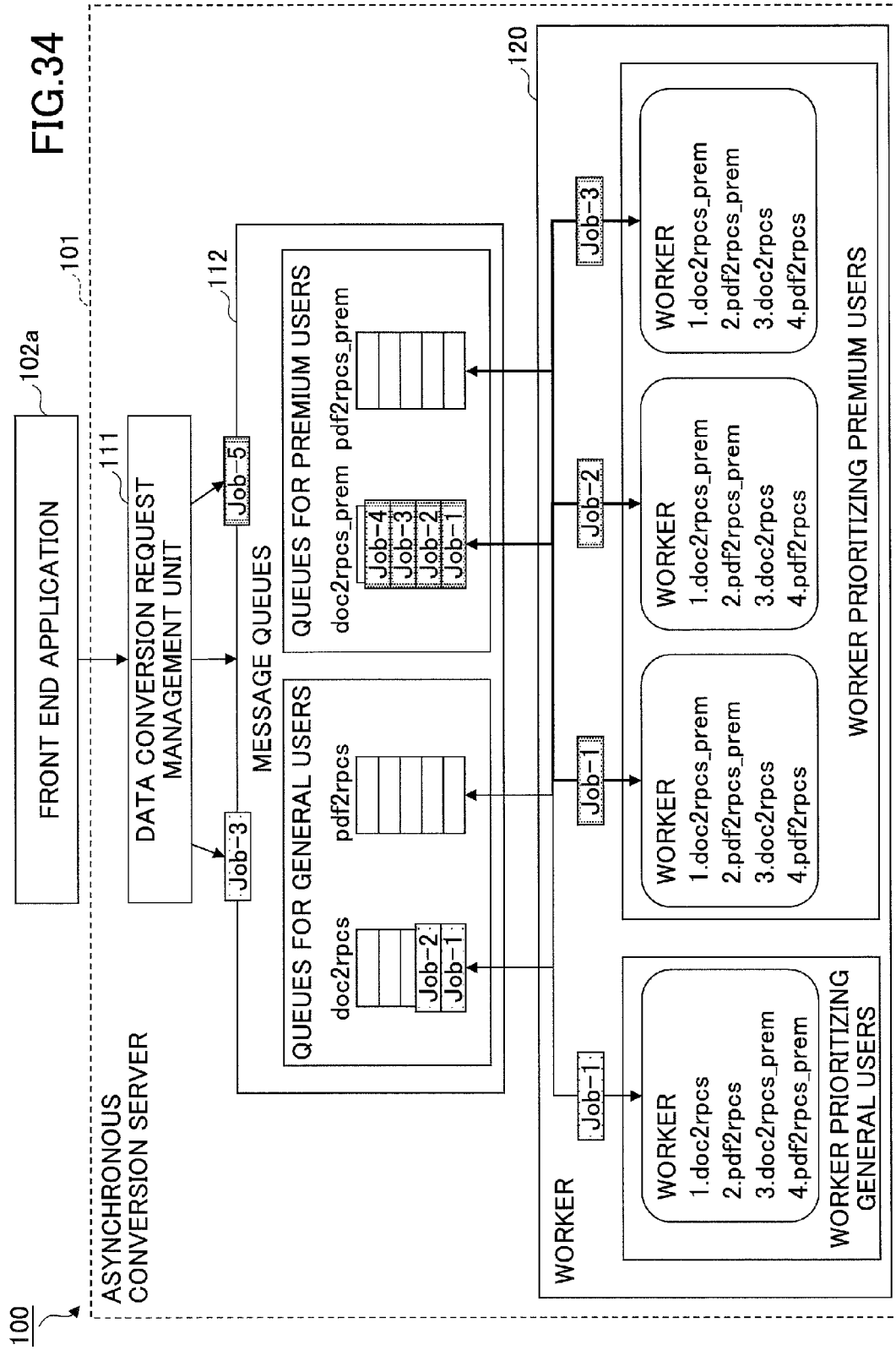

INFORMATION PROCESSING SYSTEM, INFORMATION PROCESSING APPARATUS, AND PROCESS EXECUTION METHOD

CROSS-REFERENCE TO RELATED APPLICATIONS

This application is based on and claims the benefit of priority of the Japanese Patent Application No. 2013-003182 filed on Jan. 11, 2013, and Japanese Patent Application No. 2013-216166 filed on Oct. 17, 2013, the entire contents of which are incorporated herein by reference.

BACKGROUND OF THE INVENTION

1. Field of the Invention

The disclosures herein generally relate to an information processing system, an information processing apparatus, and a process execution method.

2. Description of the Related Art

Cloud computing systems that are configured to enable cooperation between a device, a web service, and a platform providing a distributed environment are known (see e.g., Japanese Laid-Open Patent Publication No. 2011-192250).

The cloud computer system disclosed in Japanese Laid-Open Patent Publication No. 2011-192250 includes a request receiving part that receives a processing request of a job from an image forming device, a backend processing part that executes a process based on a message corresponding to the job, and a managing part that manages the number of backend processing parts.

The backend processing part includes a determination unit that determines a task execution status of the job; and a command unit that selects a task service according to the task execution status of the job from multiple task services provided by a service providing apparatus, and issues a command to the service providing device to execute the selected task service.

For example, in a case of converting data from one data format to another data format, a data conversion engine (data conversion program or data conversion library) for executing a data format conversion process may be used in order to increase independence and facilitate maintenance of the program.

Note that use of an engine is not limited to the case of executing a data format conversion process. That is, a process execution engine (process execution program or process execution library) for executing some other type of process may similarly be used to increase independence and facilitate maintenance of the program.

However, for example, in the case of using a data format conversion engine, the number of types of data conversion engines that are required corresponds to the number of different combinations of an input data format and an output data format. For example, in a case where data may be in either one of three different types of data formats before data conversion (input data formats) and the data may be converted into one of three different types of data formats (output data formats), there are nine different combinations of the input data format and the output data format, and accordingly, nine types of data conversion engines are required. In other words, the larger the number of options for the data formats before or after data conversion, the larger the number of types of data conversion engines that are required.

Thus, the number of process execution engines that need to be prepared increases as the number of types of processes to be executed (e.g., data conversion process) increases. Accordingly, there is a demand for a technique for flexibly adapting to such increase in the number of types of a process.

SUMMARY OF THE INVENTION

According to one embodiment of the present invention, an information processing system includes a managing unit that sorts a process execution request based on a type of process of the process execution request; a storing unit that stores the sorted process execution request according to the type of process of the process execution request; and a plurality of executing units that are configured to execute a process corresponding to the process execution request stored in the storing unit. At least one executing unit of the plurality of executing units is configured to split the process corresponding to the process execution request stored in the storing unit into a plurality of processes to be executed by at least two other executing units of the plurality of executing units and store in the storing unit a split process execution request including the split processes for prompting the other executing units to cooperatively execute the split processes.

According to an aspect of the present invention, accommodations may be flexibly made in response to an increase in the number of types processes to be executed.

BRIEF DESCRIPTION OF THE DRAWINGS

FIG. 6 is a sequence chart illustrating exemplary operations of an asynchronous conversion server;

FIG. 7 illustrates an exemplary manner of splitting a task included in job information;

FIGS. 8A and 8B respectively illustrate exemplary job formats before and after splitting a task;

FIG. 9 illustrates an exemplary manner in which a process is executed through cooperation of a multiple conversion engines;

FIG. 19 illustrates an exemplary data configuration of organization management information;

FIG. 20 illustrates an exemplary data configuration of user management information;

FIG. 21 illustrates an exemplary data configuration of apparatus management information;

FIG. 27 illustrates exemplary operations of step S304 of FIG. 24;

FIG. 28 illustrates an exemplary data configuration of job management information after the execution result of Job-a of FIG. 24 is written therein;

FIG. 29 illustrates exemplary operations of step S308 of FIG. 25;

FIG. 30 illustrates an exemplary data configuration of job management information after the execution result of Job-b of FIG. 25 is written therein;

FIG. 31 illustrates exemplary operations of step S312 of FIG. 26;

FIG. 32 illustrates an exemplary data configuration of job management information after the execution result of Job-c of FIG. 26 is written therein;

FIG. 33 is a block diagram illustrating an exemplary configuration of a data conversion system that does not assign priority to a processing order of jobs; and FIG. 34 is a block diagram illustrating an exemplary configuration of a data conversion system that assigns priority to a processing order of jobs.

DESCRIPTION OF THE PREFERRED EMBODIMENTS

In the following, embodiments of the present invention are described with reference to the accompanying drawings.

First Embodiment

<Cloud Printing>

Figure 1:
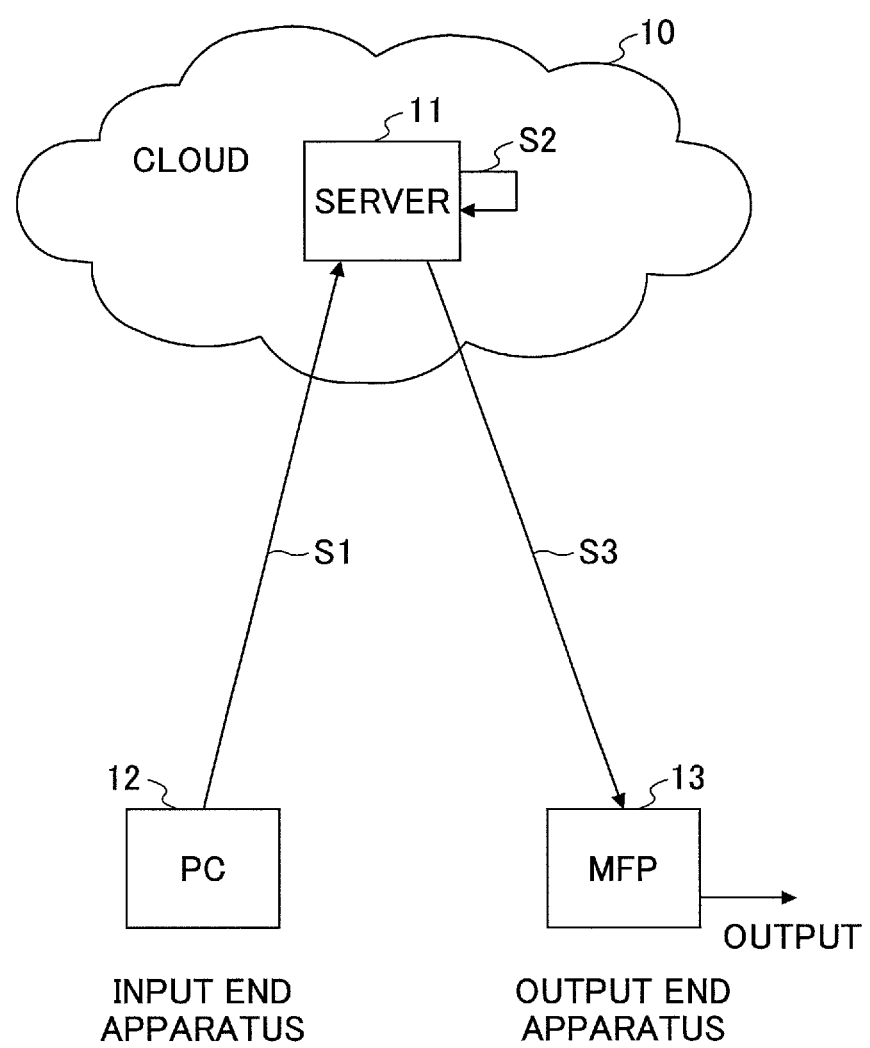
FIG. 1 schematically illustrates an exemplary mechanism of cloud printing.

FIG. 1 schematically illustrates an exemplary mechanism of cloud printing. In the following descriptions, "cloud printing" refers to a cloud computing type printing service. In step S1, an input end apparatus such as a personal computer (PC) 12 may upload an electronic file that has been created using a word processor application, for example, to a server 11 on a cloud 10.

In step S2, the server 11 may convert the uploaded electronic document file into print data in RPCS (Refined Printing Command Stream, which is a page description language developed by RICOH COMPANY, LTD.), for example. In step S3, an output end apparatus such as a MFP (Multi-Function Peripheral) 13 may receive the print data from the cloud 10 and output the print data.

When viewed from the cloud side, the PC 12 and the MFP 13 correspond to clients. The PC 12 and the MFP 13, as clients, establish communication with the server 11 on the cloud 10 to perform a certain process.

In cloud printing, a data conversion process may be performed at the cloud 10 so that a data conversion engine may not have to be provided at the PC 12 corresponding to a client. On the other hand, a wide range of data conversion engines have to be prepared at the cloud 10 side in order to accommodate various types of electronic document files, and the types of electronic document files are expected to increase further in the future. In addition, the output end apparatus is not limited to the MFP 13, and other apparatuses such as a projector or a completely unknown apparatus may be used as the output end apparatus. Further, a data conversion engine may be desired for converting data into a data format that is compatible with another cloud service, for example.

Technical problems associated with such diversification of processes are encountered not only with respect to data conversion processes but various other types of processes executed at the cloud 10 side. For example, the above problems may be encountered in a case where an image is scanned by the MFP 13, and a process of executing an OCR (optical character reader) process on the scanned image and storing the processed image data in an online storage provided by another cloud service is performed at the cloud 10 side.

Also, the above problems may be encountered in a case where a file is read from an online storage provided by another cloud service, and a data conversion process such as converting the file into print data (print file) or executing an OCR process on the file is performed at the cloud 10 side.

Note that although a process associated with cloud printing is described below, application of the present invention is not limited to cloud printing. For example, aspects of the present invention may be applied to the process of executing an OCR (optical character reader) process on an image scanned by the MFP 13 and storing the processed image data in an online storage provided by another cloud service as described above. Also, aspects of the present invention may be applied to the process of reading a file from an online storage provided by another cloud service and converting the file into print data or executing an OCR process on the file as described above, for example.

Figure 2:
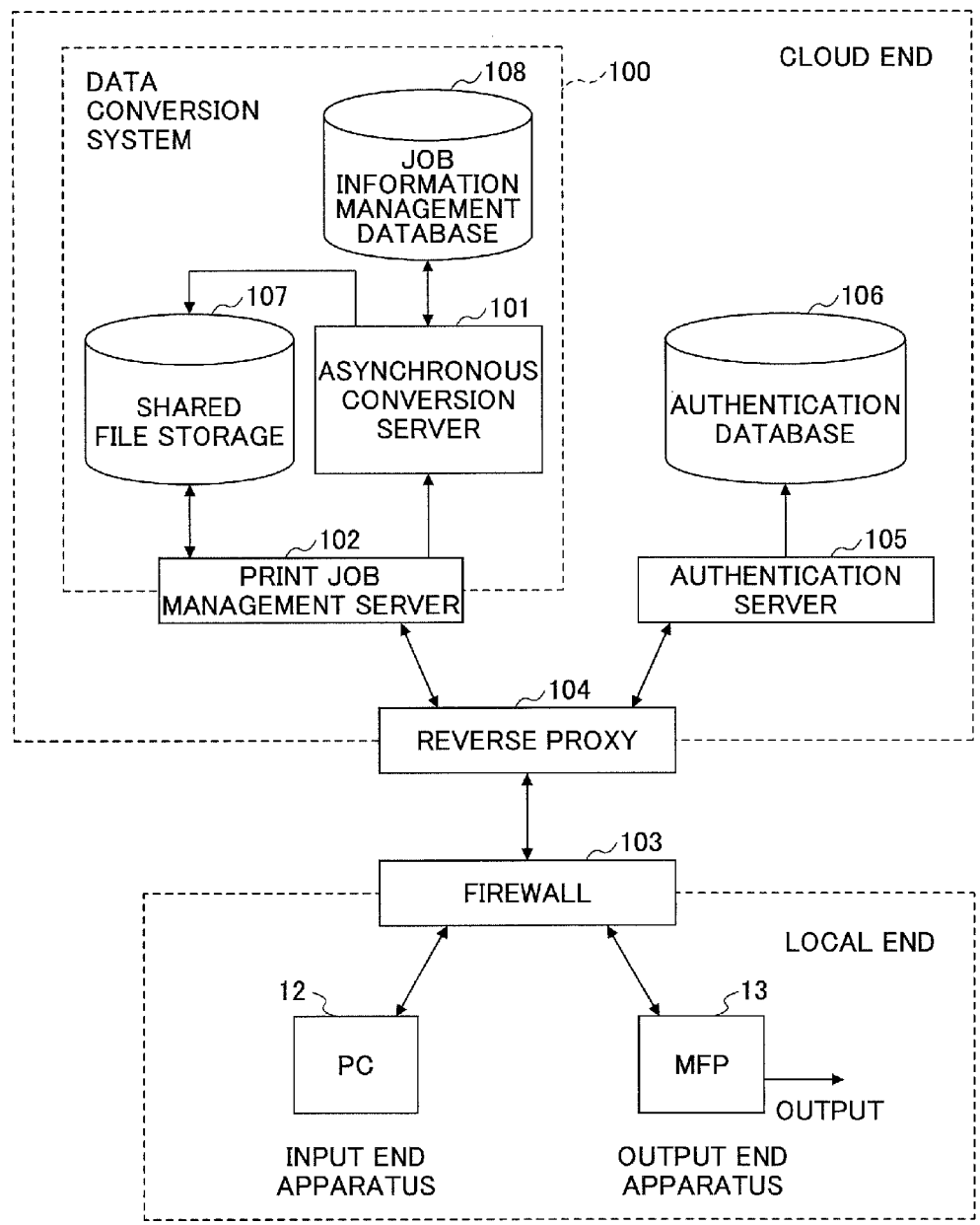
FIG. 2 is a block diagram illustrating an exemplary configuration of an information processing system implementing cloud printing according to a first embodiment of the present invention.

The cloud printing illustrated in FIG. 1 may be implemented by a cloud computing type information processing system as illustrated in FIG. 2, for example. FIG. 2 is a block diagram illustrating an exemplary configuration of the information processing system for implementing cloud printing.

In FIG. 2, the local end includes the PC 12 and the MFP 13. The PC 12 and the MFP 13 may be connected to the Internet via a firewall 103 that is set up in a gateway of the LAN, for example. The PC 12 and the MFP 13 may or may not be located within the same network. In the following descriptions, it is assumed that the PC 12 and the MFP 13 are not located within the same network.

In FIG. 2, the cloud end includes a data conversion system 100, a print job management server 102, a reverse proxy 104, an authentication server 105, and an authentication database 106.

Figure 4:
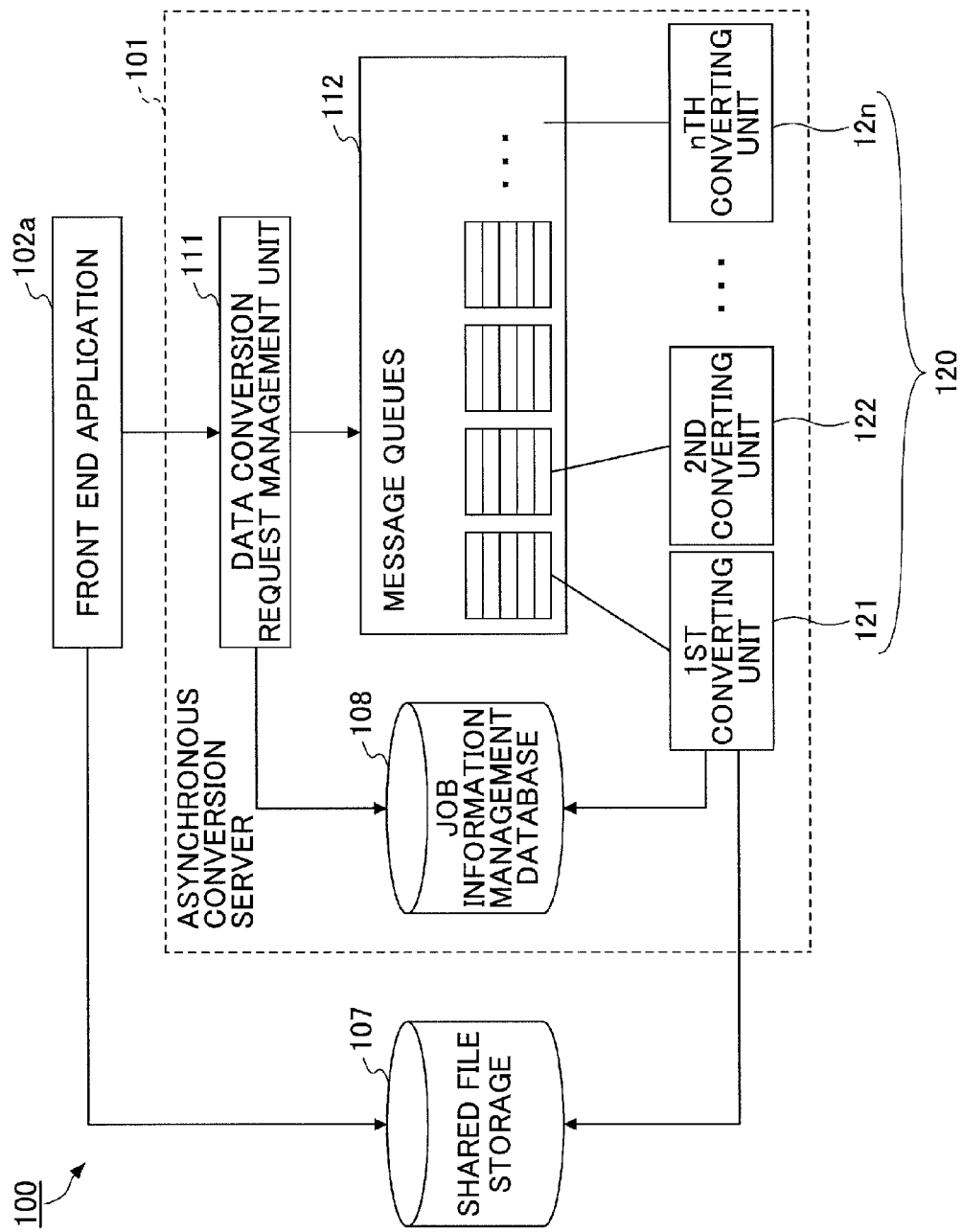
FIG. 4 is a block diagram illustrating an exemplary functional configuration of a data conversion system according to an embodiment of the present invention.

The data conversion system 100 includes an asynchronous conversion server 101, a shared file storage 107, and a job information management database 108. The shared file storage 107 may be connected externally to the data conversion system 100. In addition, the job information management database 108 may form a part of the asynchronous conversion server 101, as illustrated in FIG. 4.

The reverse proxy 104 may mediate the communication of the local end apparatus, and thus, the local end apparatus may execute a process or establish communication without regard for the internal structure of the server group or storage at the cloud end. The authentication server 105 and the authentication database 106 are configured to authenticate the user and/or the local end apparatus.

The data conversion system 100 and the print job management server 102 may manage and/or register a print job that is uploaded by the PC 12 corresponding to a local end apparatus. In a case where a print request is issued from the MFP 13 corresponding to another local end apparatus, the data conversion system 100 and the print job management server 102 may send corresponding print data to the MFP 13.

The print job may include an electronic document file that is created by a word processor application, for example. The data conversion system 100 may convert the electronic document file included in the print job into print data, that is, electronic data in a data format (PDL: Page Description Language) that may be printed and output from the MFP 13, for example.

Figure 3:
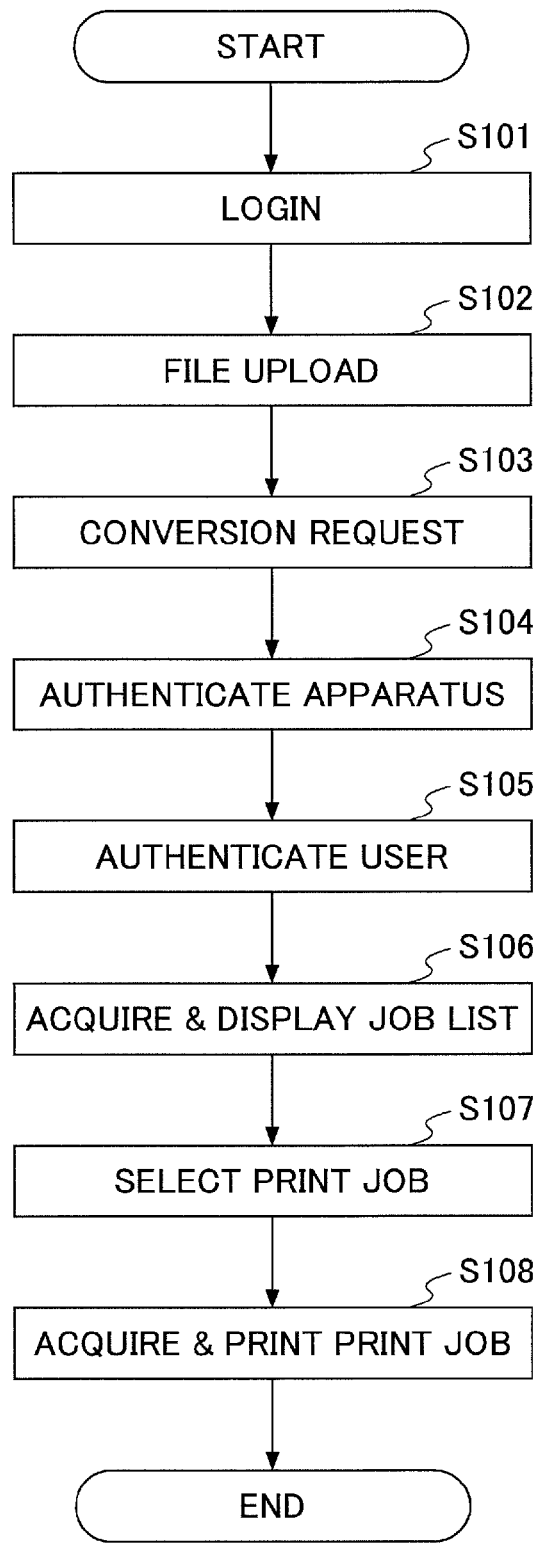
FIG. 3 is a flow chart illustrating exemplary process steps of cloud printing.

Next, an exemplary use mode of the information processing system illustrated in FIG. 2 is described with reference to FIG. 3. FIG. 3 is a flow chart illustrating exemplary process steps involved in cloud printing.

In step S101, a user logs into the cloud printing service via the PC 12. The authentication server 105 may perform an authentication process for authenticating the user. In step S102, the user uploads the electronic document file that is to be printed from the PC 12 to the cloud printing service. This uploading of the electronic document file may correspond to registration of the print job. A registration process for registering the print job may be executed by the print job management server 102. The procedures of steps S101 and S102 are performed by the PC 12.

When the print job is registered, the cloud printing service performs a data conversion process in the background. That is, the cloud printing service executes the data conversion process as an exemplary asynchronous process.

In step S103, the print job management server 102 requests the data conversion system 100 to perform a data conversion process on the registered electronic document file. Details of the data conversion process performed in step S103 are described below.

When the user wishes to print a print job, the following series of steps may be performed at the MFP 13, for example. In step S104, the cloud end confirms whether the MFP 13 is capable of accepting the cloud print service, and in this way, the MFP 13 may be authenticated (apparatus authentication). Next, the user operates the MFP 13 to log into the cloud printing service from the MFP 13, and in this way, the user may be authenticated (user authentication).

After the authentications, in step S106, the MFP 13 acquires a job list from the cloud printing service, and displays the acquired job list on a display unit. Next, in step S107, the user selects a desired print job from the displayed job list.

When the print job to be processed is selected by the user, in step S108, the MFP 13 acquires the print job from the cloud printing service and outputs (prints) the print job. By using the cloud printing service as described above, the PC 12 or the MFP 13 may not need to have a print driver (data conversion engine). Thus, for example, in the case of making overseas business trips, the information processing system of the present embodiment may be effectively used to create/upload conference materials at the office before the trip and then print out the materials at the travel destination.

<Data Conversion System>

The data conversion system 100 of the present embodiment is preferably configured to be capable of accommodating various types of data conversion requests and flexibly adapting to an increase in the number of types of data conversion requests. For example, the data conversion system 100 may have a configuration as illustrated in FIG. 4. FIG. 4 a block diagram illustrating an exemplary functional configuration of the data conversion system 100 of the present embodiment.

As illustrated in FIG. 4, the data conversion system 100 may include a front end application 102a, a shared file storage 107, and an asynchronous conversion server 101. The front end application 102a may be a function of the print job management server 102. The asynchronous conversion server 101 may provide an asynchronous conversion service. The asynchronous conversion server 101 may include a data conversion request management unit 111, message queues 112, a job information management database 108, and a plurality of converting units 120.

The print job management server 102 may include a function to receive the print job sent from the input end apparatus, such as the PC 12, and to register an electronic document file included in the print job to the shared file storage 107, for example. In addition, the print job management server 102 may determine the file conversion that is required and control the data conversion system 100 to execute the required file conversion.

The converted file may be registered in the shared file storage 107. For example, when an output command for the print job is received from the MFP 13 corresponding to an output end apparatus, the print job management server 102 may send the converted file that is registered in the shared file storage 107 to the MFP 13.

The front end application 102a may include a function to determine the file conversion required to execute the output command. In a case where the registered electronic file is a document file and the MFP 13 issuing the output command employs the RPCS, for example, the front end application 102a may determine that the registered electronic file requires conversion from the document file data format into the RPCS data format.

The front end application 102a may embed the type of data conversion required, as a parameter such as "type=doc2rpcs", for example, in a data conversion request to be sent to the asynchronous conversion server 101.

Similarly, a parameter such as a URI (Uniform Resource Indicator) of the data (or source data) before the conversion may be embedded in the data conversion request. The URI is information indicating a location of the data within the shared file storage 107.

In the asynchronous conversion server 101 that receives the data conversion request with the type of data conversion and the URI of the data embedded therein, the data conversion request management unit 111 may receive the data conversion request and analyze the data conversion request. The data conversion request management unit 111 may then enqueue a message (job) in one of the message queues 112 according to the type of data conversion of the data conversion request.

At the same time, the data conversion request management unit 111 may register or update information relating to the data conversion request in the job information management database 108 in parallel with the operation of enqueuing the message into one of the message queues 112.

The information registered in the job information management database 108 may include the location of the file (URI in the shared file storage 107), the type of data conversion included in the data conversion request, and a status of the data conversion request, for example. The status of the data conversion request may include statuses such as "executing data conversion," "converting data," and "data conversion completed," for example. The status of the data conversion request may represent the progress or processing status of the data conversion.

The message queues 112 may include queues corresponding to each of the plurality of converting units 120. FIG. 4 illustrates an example in which each converting unit 120 and each queue of the message queues 112 correspond to one another on a one-to-one basis, however, in other examples two or more converting units 120 may correspond to two or more queues of the message queues 112. In other words, the correspondence between the converting units 120 and the queues of the message queues 112 may be one-to-one or many-to-many.

Each converting unit 120 may monitor the corresponding queue of the message queues 112. When a message is enqueued into the corresponding queue, the converting unit 120 may acquire the registered information of the data conversion request corresponding to the message from the job information management database 108. Each converting unit 120 may acquire corresponding data stored in the shared file storage 107, based on the URI included in the information of the data conversion request acquired from the job information management database 108.

Then, each converting unit 120 may convert the acquired data. Each converting unit 120 may register the converted data in the shared file storage 107, and rewrite and update the registered information of the data conversion request in the job information management database 108. In addition, as described in detail below, when two or more of the converting units 120 are to cooperatively perform a data conversion process, each of the converting units 120 that completes data conversion may enqueue a new message into a next queue of the message queues 112 corresponding to the next converting unit 120 that is to perform data conversion.

Figure 5:
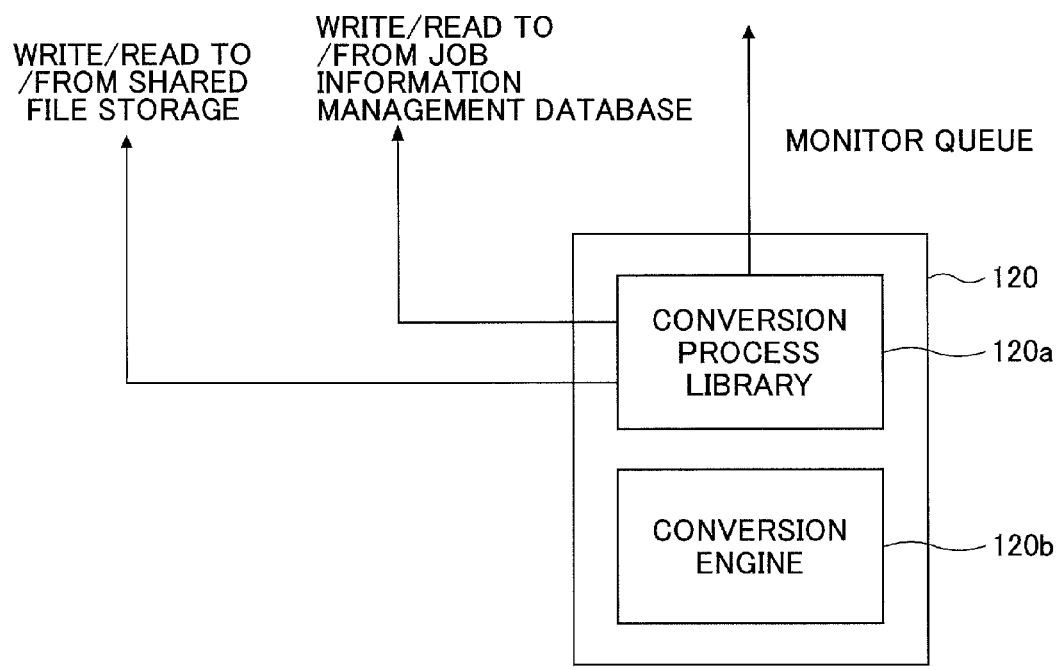
FIG. 5 is a block diagram illustrating a detailed configuration of a converting unit.

FIG. 5 is a block diagram illustrating a detailed structure of the converting unit 120 illustrated in FIG. 4. As illustrated in FIG. 5, the converting unit 120 may include a conversion process library 120a and a conversion engine 120b. The conversion process library 120a may execute processes such as monitoring a queue of the message queues 112 corresponding to the converting unit 120 of the conversion process library 120a, and registering converted data in the shared file storage 107, for example.

The conversion process library 120a may also perform a process of rewriting and updating information of a data conversion request registered in the job information management database 108. Further, in the case of cooperating with another converting unit 120 to perform a data conversion process, the conversion process library 120a may perform a process of inserting a new message after data conversion into a next queue of the message queues 112 corresponding to the other converting unit 120 that is to perform the next data conversion. For example, the conversion engine 120b may include the following:

- "doc2rpcs": an engine to convert an electronic document file into RPCS;
- "pdf2rpcs": an engine to convert PDF (Portable Document Format) into RPCS;
- "img2pdf": an engine to convert an image file into PDF;
- "html2pdf": an engine to convert a HTML (Hyper Text Markup Language) file into PDF; and
- "txt2pdf": an engine to convert a text file into PDF.

<Asynchronous Conversion Service>

Next, an exemplary flow of the asynchronous conversion service provided by the asynchronous conversion server 101 illustrated in FIG. 4 is described with reference to FIG. 6. FIG. 6 is a sequence chart illustrating exemplary operations of the asynchronous conversion server 101.

In step S11, the front end application 102a sends a data conversion request (job registration request) with respect to data registered in the shared file storage 107 to the data conversion request management unit 111 of the data conversion system 100. That is, the asynchronous conversion service is started when the front end application 102a sends the data conversion request with respect to data stored in the shared file storage 107 to the data conversion request management unit 111.

The data conversion request sent in step S11 may have a parameter indicating a type of data conversion such as "type=doc2rpcs" embedded therein. Also, the data conversion request may have a parameter such as a URI indicating the location of the data to be converted embedded therein.

In step S12, the data conversion request management unit 111 that receives the data conversion request (job) may analyze the job and determine whether there is a converting unit 120 that executes data conversion matching the type of data conversion of the data conversion request. When there is a converting unit 120 that executes data conversion matching the type of data conversion of the data conversion request, the data conversion request management unit 111 may register the job in a queue of the message queues 112 corresponding to such converting unit 120.

In step S13, the data conversion request management unit 111 returns a job registration result to the front end application 102a. In the following descriptions, it is assumed that the job has been registered in a queue of the message queues 112 corresponding to a first converting unit 121 of the converting units 120. The queue corresponding to the first converting unit 121 queues jobs that may be processed by the first executing unit 121.

In step S14, the first converting unit 121, which monitors its corresponding queue, detects that a job has been added (registered) to its corresponding queue. In step S15, the first converting unit 121 acquires information of the job registered in the queue from the job information management database 108.

The first converting unit 121 analyzes a task included in the acquired job information, and splits the task into plural types of tasks (data conversion tasks) that may be processed by the converting units 120. For example, the process of splitting a task into plural types of task in step S15 may be performed as illustrated in FIG. 7.

FIG. 7 illustrates an exemplary manner of splitting a task included in job information into plural types of tasks. FIG. 7 illustrates an example where "html2rpcs" corresponds to the type of data conversion called by the task. The type of data conversion "html2rpcs" refers to converting a HTML file into RPCS. It is assumed in the present example that a HTML file cannot be converted into a RPCS file (print data) using only one of the converting units 120.

Accordingly, the front end application 102a arranges for a plurality of the converting units 120 to cooperatively perform the data conversion "html2rpcs." For example, the front end application 102a may register the job with the task "html2rpcs" in the queue of the message queues 112 corresponding to the first converting unit 121, which can split the task "html2rpcs" into two tasks, "html2pdf" and "pdf2rpcs." The first converting unit 121, upon detecting that the job has been registered in its corresponding queue, may split the task "html2rpcs" into two tasks, "html2pdf" and "pdf2rpcs." Then, the first converting unit 121 may re-register the job as a job including the two tasks "html2pdf" and "pdf2rpcs" in a queue corresponding to the type of data conversion to be performed as a next task. In this way, data conversion may be performed through cooperation of a plurality of converting units 120.

FIGS. 8A and 8B respectively illustrate exemplary job formats before and after splitting a task. The job formats illustrated in FIGS. 8A and 8B are in the JSON format.

FIG. 8A illustrates an exemplary job format before a task is split. The job format illustrated in FIG. 8A includes a task calling for the type of data conversion "html2rpcs." In the following, it is assumed that the converting units 120 include a second converting unit 122 that is capable of performing a type of data conversion "html2pdf," and a third converting unit 123 that is capable of performing a type of data conversion "pdf2rpcs." Also, it is assumed that a converting unit capable of performing the type of data conversion "html2rpcs" is not included in the converting units 120.

In the present example, the first converting unit 121 that is capable of splitting the task "html2rpcs" into two tasks, "html2pdf" and "pdf2rpcs," is used to change the job format of FIG. 8A into a job format as illustrated in FIG. 8B. The job format illustrated in FIG. 8B includes the two tasks, "html2pdf" and "pdf2rpcs," split from the task "html2rpcs."

The first converting unit 121 generates a job including tasks for types of data conversion that may be performed by the second converting unit 122 and the third converting unit 123 from a job including a task for a type of data conversion that cannot be performed by any of the converting units 120. By generating a job including tasks for types of data conversion that may be performed by the second converting unit 122 and the third converting unit 123, the first converting unit 121 may enable the second converting unit 122 and the third converting unit 123 to cooperatively perform a data conversion process.

Referring back to FIG. 6, in step S16, the first converting unit 121 registers the job including the split tasks in a queue corresponding to one of the converting units 120 that is configured to perform the type of data conversion designated as a next task (e.g., "html2pdf"). In step S17, the second converting unit 122, which monitors its corresponding queue that accepts jobs executable by the second converting unit 121, detects that a job has been registered in its corresponding queue.

In step S18, the second converting unit 122 acquires job information of the job registered in its corresponding queue from the job information management database 108. The second converting unit 122 analyzes the acquired job information and acquires data from the shared file storage 107 based on a URI included in information of a first task at the front of the queue. Then, the second converting unit 122 performs data conversion on the acquired data according to the type of data conversion designated by the information of the first task.

After converting the data, the second converting unit 122 registers or updates the converted data in the shared file storage 107. Also, the second converting unit 122 updates job information of the relevant job registered in the job information management database 108 to indicate that the second converting unit 122 has converted the data. For example, the status of the data conversion request (job) may be updated to "data conversion in progress."

Then, in step S19, the second converting unit 122 deletes the information of the first task (processed task) from the job information and registers the job including the remaining tasks in a queue corresponding to one of the converting units 120 that is configured to perform the type of data conversion designated as the next task (e.g., "pdf2rpcs").

In step S20, the third converting unit 123, which monitors its corresponding queue that accepts jobs executable by the third converting unit 123, detects that a job has been registered in its corresponding queue. In step S21, the third converting unit 123 acquires the job information of the registered job from the job information management database 108.

The third converting unit 123 analyzes the acquired job information, acquires data stored in the shared file storage 107 based on a URI included in information of a first task at the front of the queue, and performs data conversion on the acquired data according to the type of data conversion designated in the information of the first task.

After converting the data, the third converting unit 123 registers or updates the converted data in the shared file storage 107. Also, the third converting unit 123 updates job information of the relevant job registered in the job information management database 108 to indicate that the third converting unit 123 has converted the data. For example, the status of the data conversion request (job) may be updated to "data conversion completed." Then, in step S22, the third converting unit 123 deletes the information of the first task (processed task) from the job, and because the job information includes no more subsequent tasks to be executed, the third converting unit 123 ends the process without registering the job in another queue.

According to an aspect of the present embodiment, by performing the above-described operations, even when a converting unit 120 that is capable of directly converting data according to a data conversion request is unavailable, a new converting unit 120 that is capable of such direct conversion does not have to be prepared, and instead, a plurality of existing converting units 120 may be arranged to cooperatively process the data conversion request.

As described above, the number of types of data conversion that may be requested may increase after the data conversion system 100 is launched. The present embodiment may be capable of flexibly adapting to such a situation as illustrated in FIG. 9.

Also, according to another aspect of the present embodiment, the front end application 102a may register a job as that including only one task to be executed by one of the converting units 120. That is, the front end application 102a need not treat the job as that including a plurality of tasks to be executed by a plurality of the converting units 120, and the job may still be executed through cooperation of the plurality of the converting units 120.

Note that the converting units 120 are not limited to the examples described above. In other examples, a converting unit 120 that is capable of converting a barcode image data into character string data, a converting unit 120 that is capable of performing an OCR process on data of an image file to convert the data into character string data, and converting units 120 capable of performing other types of conversion processes may be provided. Note also that embodiments of the present invention may be combined to the extent practicable.

Second Embodiment

In the following, a second embodiment of the present invention is described. Note that features of the second embodiment that overlap with those of the first embodiment are given the same reference numerals and their descriptions are omitted.

<Performing an OCR Process on an Image File and Storing the Processed File in an Online Storage>

Figure 10:
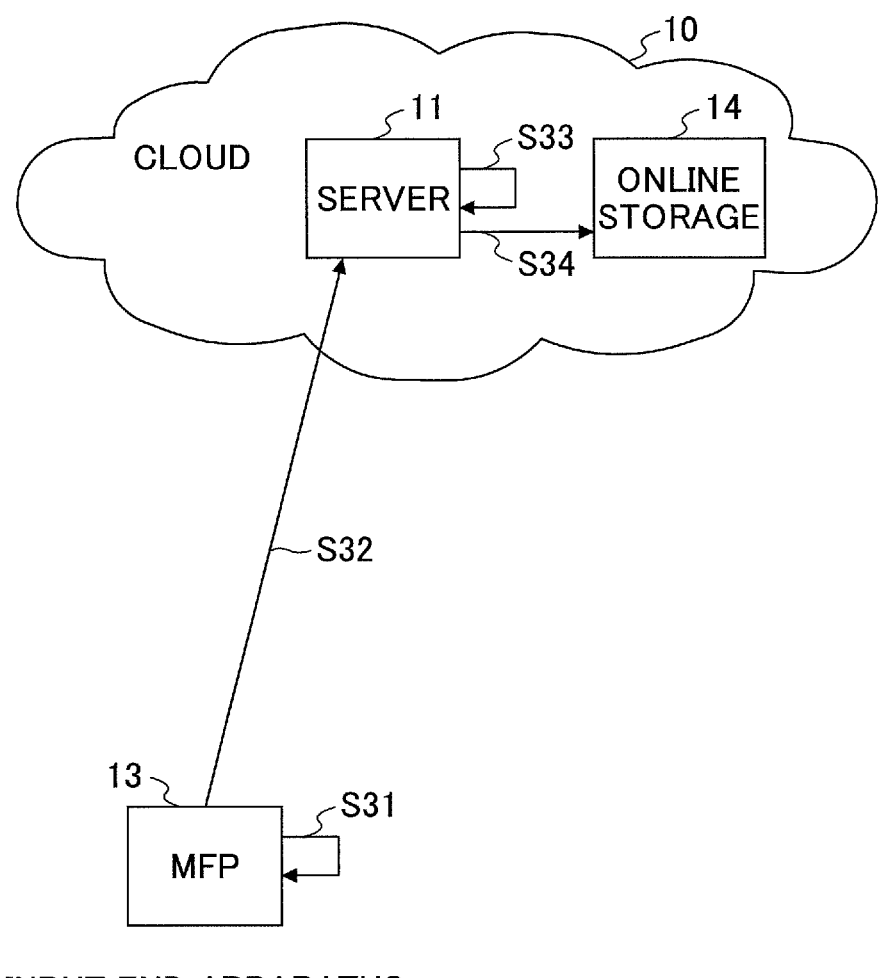
FIG. 10 schematically illustrates an exemplary process of executing an OCR process on an image file and storing the processed file in an online storage.

FIG. 10 schematically illustrates an exemplary process of performing an OCR process on an image file and storing the processed file in an online storage.

In step S31, the MFP 13 as an exemplary input end apparatus may generate image data (image file) by scanning a document, for example. In step S32, the MFP 13 uploads the generated image file to the server 11 on the cloud 10.

In step S33, the server 11 performs an OCR process on the uploaded image file to convert the image file into a text file. In step S34, the server 11 stores the converted text file in an online storage 14 on the cloud 10. Note that the types of the online storage 14 provided over the cloud 10 are expected to increase in the future.

Accordingly, the same problems as those encountered in the case of performing data conversion for cloud printing as described above are encountered in the case of performing an OCR process on an image scanned by the MFP 13 at the cloud 10 side and storing the processed data in an online storage 14 provided by another cloud service.

Figure 11:
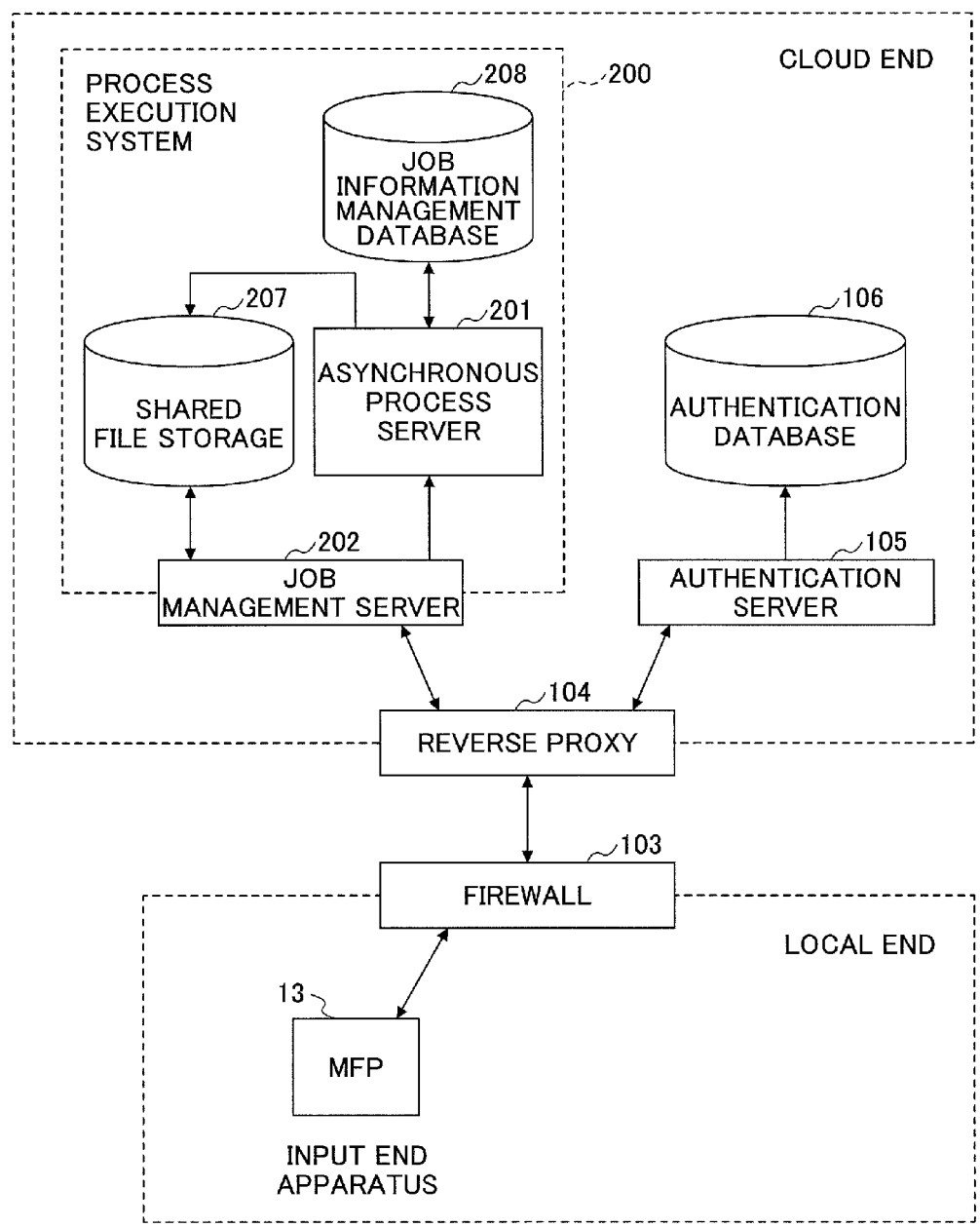
FIG. 11 is a block diagram illustrating an exemplary configuration of an information processing system according to a second embodiment of the present invention that implements the process of executing an OCR process on an image file and storing the processed file in an online storage.

The process of performing an OCR process on an image file and storing the processed data in an online storage as illustrated in FIG. 10 may be implemented by a cloud computing type information processing system as illustrated in FIG. 11, for example. FIG. 11 is a block diagram illustrating an exemplary configuration of an information processing system for implementing the process of performing an OCR process on an image file and storing the processed data in an online storage.

In FIG. 11, the MFP 13 is provided at the local side. The MFP 13 is connected to a network such as the Internet via the firewall 103. The cloud side includes a process execution system 200, a job management server 202, the reverse proxy 104, the authentication server 105, and the authentication database 106.

The information processing system as illustrated in FIG. 11 differs from that illustrated in FIG. 2 in that the local side does not include the PC 12, the data conversion system 100 is replaced by the process execution system 200, and the print job management server 102 is replaced by the job management server 202. The process execution system 200 of FIG. 11 may execute various types of processes including performing an OCR process on an image file, storing a text file in an online storage, and the data conversion processes described above in connection with the first embodiment.

The process execution system 200 includes an asynchronous process server 201, a shared file storage 207, and a job information management database 208. Note that the shared file storage 207 may be identical to the shared file storage 107 of the first embodiment, and the job information management database 208 may be identical to the job information management database 108 of the first embodiment.

The process execution system 200 and the job management server 202 manage/register jobs that are uploaded by the MFP 13 corresponding to a local side apparatus. The process execution system 200 performs an OCR process on an image file included in a job to convert the image file into a text file. The process execution system 200 stores the stores the text file converted from the image file by the OCR process in the online storage 14. Note that a job uploaded by the MFP 13 includes an image file of an image scanned by the MFP 13.

<<Process Execution System>>

In order to accommodate various process execution requests and flexibly adapt to an increase in the number of types process execution requests, the process execution system 200 according to the present embodiment may have a configuration as described below, for example.

Figure 12:
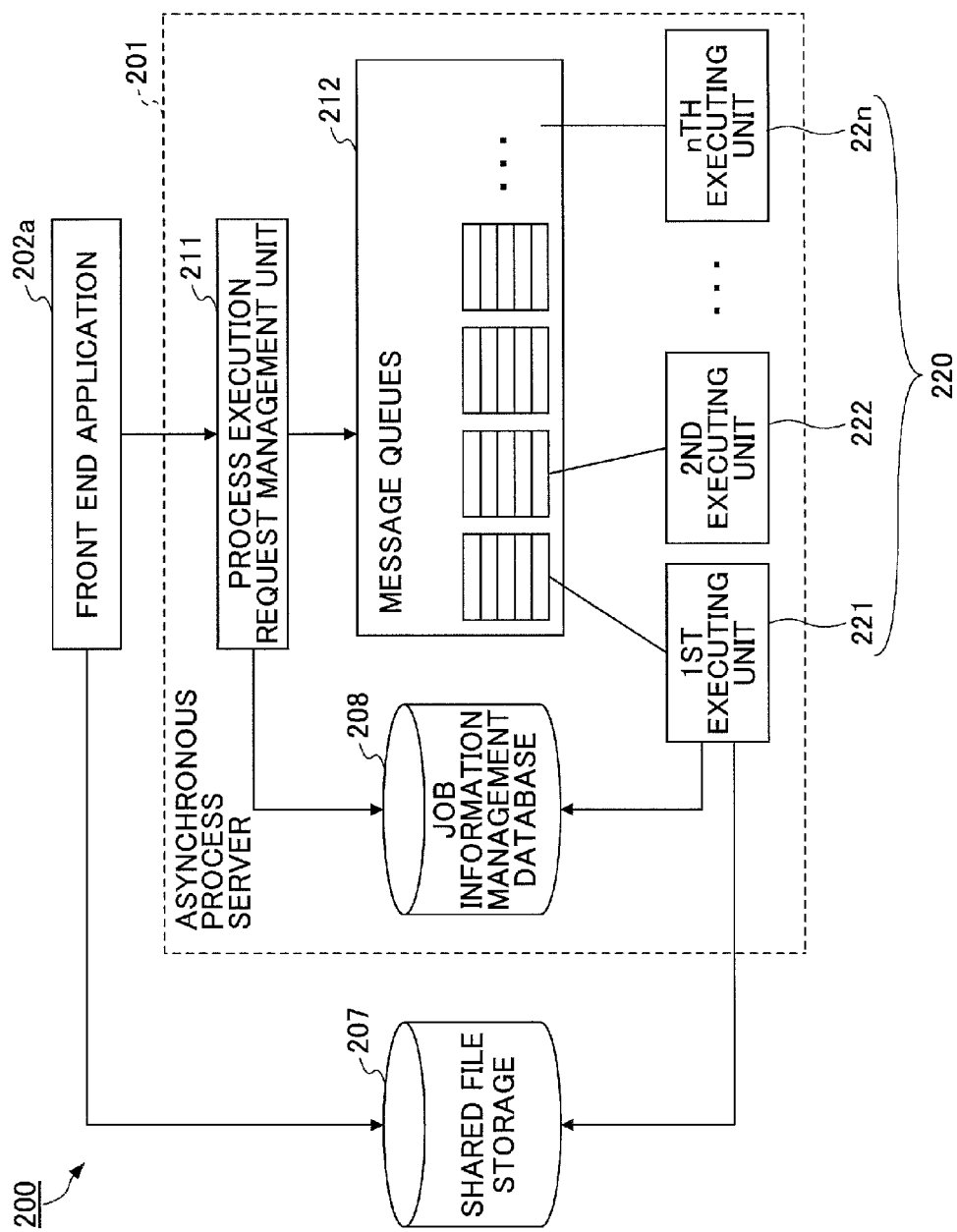
FIG. 12 is a block diagram illustrating an exemplary configuration of a process execution system according to the second embodiment.

FIG. 12 is a block diagram illustrating an exemplary configuration of the process execution system 200 according to the present embodiment. In FIG. 12, the process execution system 200 includes a front end application 202a, the shared file storage 207, and the asynchronous process server 201. The front end application 202a may be a function of the job management server 202. The asynchronous process server 201 may provide an asynchronous process service. The asynchronous process server 201 may include a process execution request management unit 211, message queues 212, the job information management database 208, and a plurality of executing units 220.

The job management server 202 may include a function to receive a job sent from the input end apparatus, such as the MFP 13, and to register a file such as an image file included in the job to the shared file storage 207, for example. In addition, the job management server 202 may determine a process that needs to be executed and control the process execution system 200 to execute the required process.

The process execution system 200 defines tasks that make up a process of a job, and treats the job as a plurality of tasks. The process execution system 200 registers jobs in the message queues 212 to have the executing units 220 execute the processes requested by the jobs. The executing units 220 may be implemented by a worker, for example. For example, the executing unit 220 may perform an OCR process on an image file sent from an input side apparatus such as the MFP 13, and store the processed data in the online storage 14.

The front end application 202a may include a function to determine the required process. The front end application 202a may embed the type of process required, as a parameter in a process execution request (job) to be sent to the asynchronous process server 201. Similarly, front end application 202a may embed a URI (Uniform Resource Indicator) of the image file on which a process is to be executed as a parameter in the process execution request.

In the asynchronous process server 201 that receives the process execution request including at least the type of process and the URI of the image file, the process execution request management unit 211 may receive the process execution request and analyze the process execution request. The process execution request management unit 211 may then enqueue the job (message) in one of the message queues 212 according to the type of process being requested.

At the same time, the process execution request management unit 211 may register or update information relating to the process execution request in the job information management database 208 in parallel with the operation of enqueuing the message into one of the message queues 212. The information registered in the job information management database 208 may include the location of the relevant file such as the image file (URI on the shared file storage 107), the type of process included in the process execution request, and a status of the process execution request, for example.

The message queues 212 may include queues corresponding to each of the plurality of executing units 220. FIG. 12 illustrates an example in which each executing unit 120 and each queue of the message queues 212 correspond to one another on a one-to-one basis, however, in other examples two or more executing units 220 may correspond to two or more queues of the message queues 212. In other words, the correspondence between the executing units 220 and the queues of the message queues 212 may be one-to-one or many-to-many.

Each executing unit 220 may monitor its corresponding queue of the message queues 212. Upon detecting that a message has been enqueued in its corresponding queue, the executing unit 220 may acquire job information of the process execution request corresponding to the queued message from the job information management database 208. Each executing unit 220 may acquire corresponding data stored in the shared file storage 207, based on the URI included in the job information of the process execution request acquired from the job information management database 208.

Then, each executing unit 220 may process the acquired data. Each executing unit 220 may register the processed data in the shared file storage 207, and rewrite and update the job information of the process execution request in the job information management database 208. In addition, when two or more of the executing units 220 are to cooperatively perform a process, each of the executing units 220 that completes a relevant process may enqueue a new message into a next queue of the message queues 212 corresponding to the next executing unit 220 that is to perform a next process.

Figure 13:
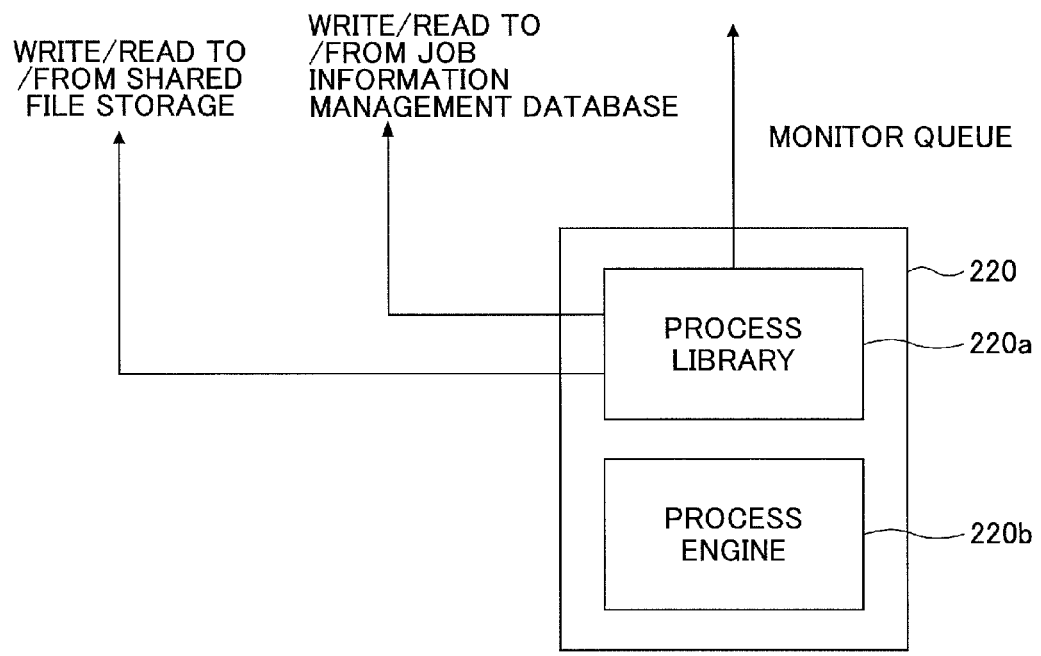
FIG. 13 is a block diagram illustrating a detailed configuration of an executing unit.

FIG. 13 is a block diagram illustrating a detailed structure of the executing unit 220. As illustrated in FIG. 13, the executing unit 220 may include a process library 220a and a process engine 220b. The process library 220a may execute processes such as monitoring a queue of the message queues 212 corresponding to the executing unit 220 of the process library 220a, and registering processed data in the shared file storage 207, for example.

The process library 220a may also perform a process of rewriting and updating information of a process execution request registered in the job information management database 208. Further, in the case of cooperating with another executing unit 220 to perform a process, the process library 220a, after completing a relevant process, may enqueue a new message in a next queue of the message queues 112 corresponding to the other executing unit 220 that is to perform a next process.

The process engine 220b may, for example, include the following:
- an engine to perform an OCR process on an image file;
- an engine to store a file in an online storage;
- an engine to convert an image/text/HTML file into PDF;
- an engine to convert a document/PDF file into RPCS;
- an engine to convert a document/PDF file into an image file (e.g., jpeg, tiff); and
- an engine to convert a document/PDF file into a preview image file.

(Asynchronous Process Service)

Figure 14:
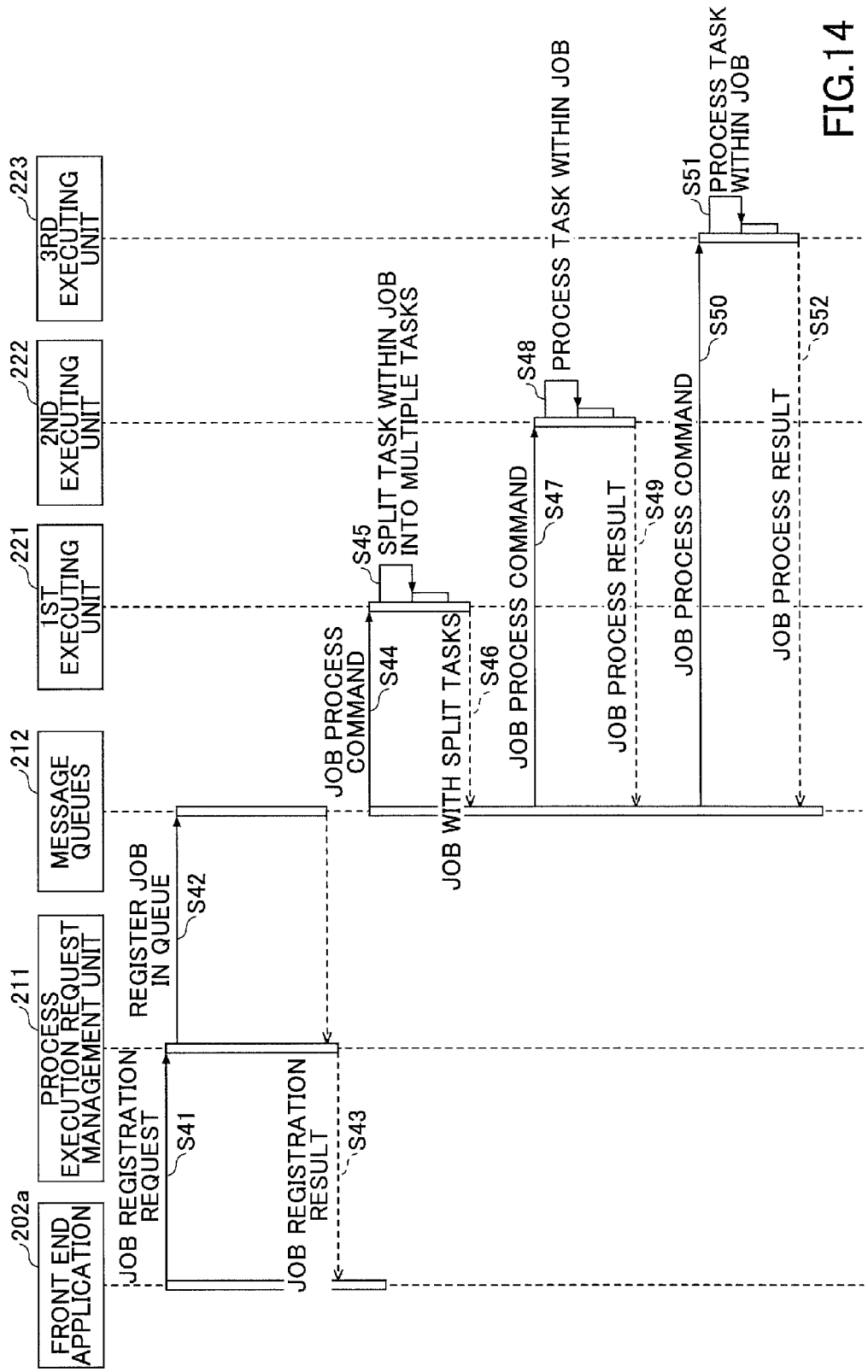
FIG. 14 is a sequence chart illustrating exemplary operations of an asynchronous process server.

Next, an exemplary flow of the asynchronous process service provided by the asynchronous process server 201 illustrated in FIG. 12 is described with reference to FIG. 14. FIG. 14 is a sequence chart illustrating exemplary operations of the asynchronous process server 201.

In step S41, the front end application 202a sends a process execution request (job registration request) with respect to data registered in the shared file storage 207 to the process execution request management unit 211 of the process execution system 200. That is, the asynchronous process service is started when the front end application 202a sends the data conversion request with respect to data stored in the shared file storage 207 to the process execution request management unit 211.

The process execution request sent in step S41 may be have a parameter indicating a type of process such as a "type=img2ocr" embedded therein. Also, the process execution request may have a parameter such as a URI indicating the location of the data to be processed embedded therein.

In step S42, the process execution request management unit 211 that receives the process execution request (job registration request) may analyze the job and determine whether there is an executing unit 220 that executes a process matching the type of process of the job. When there is an executing 120 that executes a process matching the type of process of the job, the process execution request management unit 211 may register the job in a queue of the message queues 212 corresponding to such executing unit 220.

In step S43, the process execution request management unit 211 returns a job registration result to the front end application 202a. In the following descriptions, it is assumed that the job has been registered in a queue of the message queues 212 corresponding to a first executing unit 221 of the executing units 220. The queue corresponding to the first executing unit 221 queues jobs that may be processed by the first executing unit 221 (e.g., process of performing an OCR process on an image file and storing the processed file in an online storage).

In step S44, the first executing unit 221, which monitors its corresponding queue, detects that a job has been registered in its corresponding queue. In step S45, the first executing unit 221 acquires information of the job registered in the queue from the job information management database 208.

The first executing unit 221 analyzes a task included in the acquired job information, and splits the task into plural types of tasks that may be processed by the executing units 220. For example, the process of splitting a task into plural types of task in step S45 may be performed as illustrated in FIG. 15.

Figure 15:
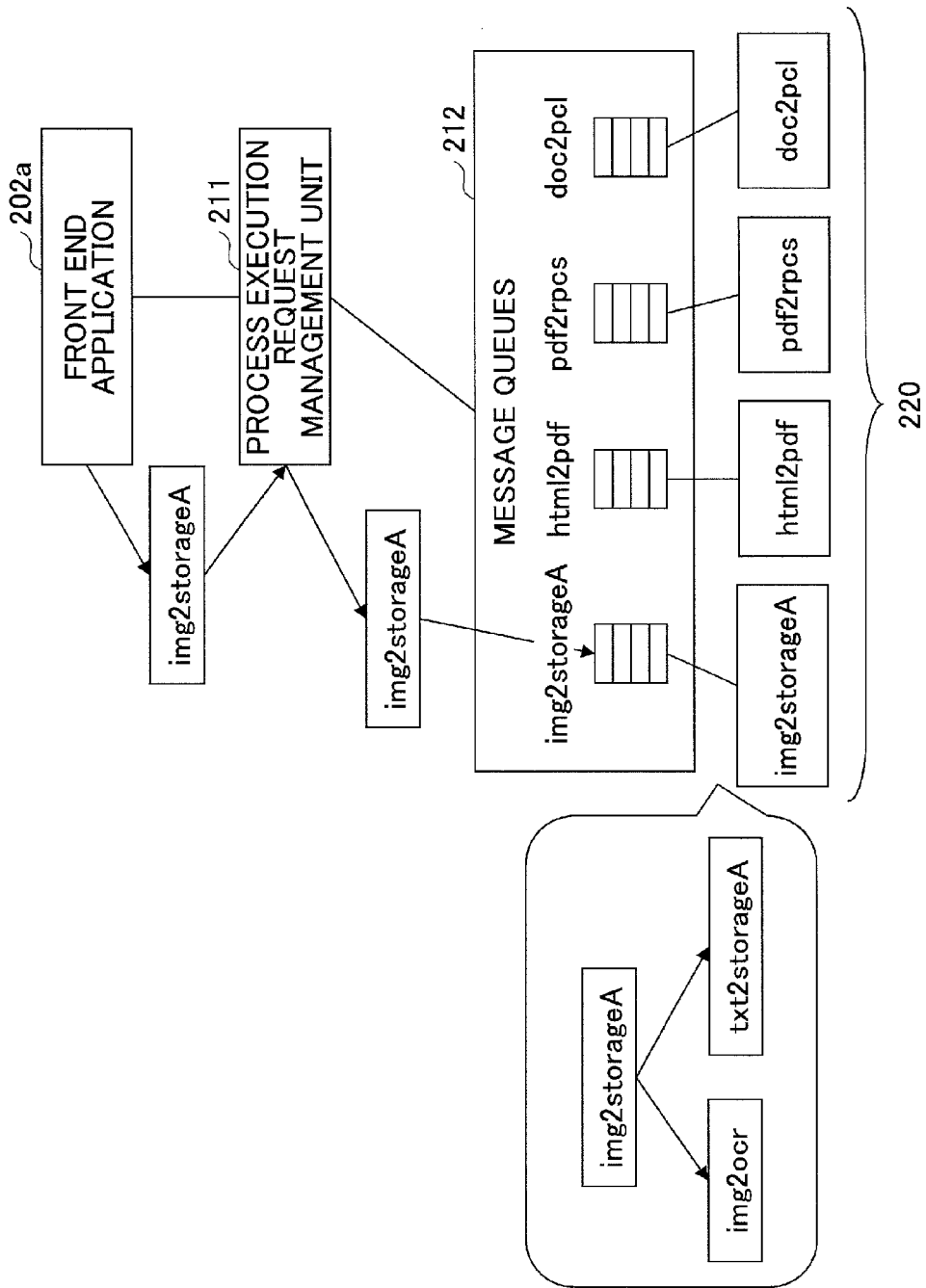
FIG. 15 illustrates an exemplary manner of splitting a task included in job information.

FIG. 15 illustrates an exemplary manner of splitting a task included in job information into two or more types of tasks. FIG. 15 illustrates an example where "img2storageA" corresponds to the type of process being requested. The type of process "img2storageA" refers to a process of performing an OCR process on an image file and storing a resulting text file in an online storage A. It is assumed in the present example that the process of performing an OCR process on an image file and storing a resulting text file in an online storage A cannot be performed using only one of the executing units 220.

Accordingly, the front end application 202a arranges for a plurality of the executing units 220 to cooperatively perform the process "img2storageA." For example, the front end application 202a may register the job with the task "img2storageA" in the queue of the message queues 212 corresponding to the first executing unit 221, which can split the task "img2storageA" into two tasks, "img2ocr" and "txt2storageA." After splitting the task, the first executing unit 221 may re-register the job as a job including the two tasks "img2ocr" and "txt2storageA" in a queue corresponding to an executing unit 220 that can execute the next task. In this way, a process may be performed through cooperation of a plurality of executing units 220.

That is, the first executing unit 221 generates a job including types of tasks that can be processed by a second executing unit 222 and a third executing unit 223 from a job including a task that cannot be processed by the any of the executing units 220. In this way, the first executing unit 221 may enable the second executing unit 222 and the third executing unit 223 to cooperatively execute a process.

Referring back to FIG. 14, in step S46, the first executing unit 221 registers the job including the split tasks in a queue corresponding to one of the executing units 220 that is configured to perform the type of process designated as a next task (e.g., "img2ocr"). In step S47, the second executing unit 222, which monitors its corresponding queue that accepts jobs executable by the second executing unit 221, detects that a job has been registered in its corresponding queue.

In step S48, the second executing unit 222 acquires job information of the job registered in its corresponding queue from the job information management database 208. The second executing unit 222 analyzes the acquired job information, acquires data from the shared file storage 207 based on a URI included in information of a first task at the front of the queue, and performs a process on the acquired data according to the type of process designated by the information of the first task.

The second executing unit 222 then registers or updates the processed data in the shared file storage 207. Also, the second executing unit 222 updates job information of the relevant job registered in the job information management database 208 to indicate that the second executing unit 222 has converted the data. For example, the status of the process execution request (job) may be updated to "process in progress."

Then, in step S49, the second executing unit 222 deletes the information of the first task (processed task) from the job information and registers the job including the remaining tasks in a queue corresponding to one of the executing units 220 that is configured to perform the type of process designated as the next task (e.g., "txt2storageA").

In step S50, the third executing unit 223, which monitors its corresponding queue that accepts jobs executable by the third executing unit 223, detects that a job has been registered in its corresponding queue. In step S51, the third executing unit 223 acquires the job information of the registered job from the job information management database 208.

The third executing unit 223 analyzes the acquired job information, acquires data stored in the shared file storage 207 based on a URI included in information of a first task at the front of the queue, and performs a process on the acquired data according to the type of process designated in the information of the first task. For example, the third executing unit 223 may execute a process of storing processed data in the online storage A. Also, the third executing unit 223 updates job information of the relevant job registered in the job information management database 208 to indicate that the third executing unit 223 has executed the above process. For example, the status of the process execution request (job) may be updated to "process completed."

Then, in step S52, the third executing unit 223 deletes the information of the first task (processed task) from the job information, and because the job information includes no more subsequent tasks to be executed, the third executing unit 223 ends the process without registering the job in another queue.

According to an aspect of the present embodiment, by performing the above-described operations, even when an executing unit 220 capable of directly performing a process corresponding to a process execution request is unavailable, a new executing unit 220 that is capable of executing such a process does not have to be prepared, and instead, a plurality of existing executing units 220 (process engines 220b) may be arranged to cooperatively process the process execution request.

As described above, the number of types of process execution requests may increase after the process execution system 200 is launched. The present embodiment may be capable of flexibly adapting to such a situation. Also, according to another aspect of the present embodiment, the front end application 202a may register a job including only one task. That is, the front end application 202a need not treat the job as including a plurality of tasks to be executed by a plurality of the converting units 120, but the job may still be executed through cooperation of the plurality of the converting units 120.

Note that the types of the executing units 220 are not limited to the above-described examples. Also, embodiments of the present invention may be combined to the extent practicable.

Third Embodiment

In the following, a third embodiment of the present invention is described for flexibly adapting to an increase in the types of processes such as data conversion processes. Note that the third embodiment is described below in connection with an exemplary case of flexibly adapting to an increase in the types of data conversion processes.

<System Configuration>

Figure 16:
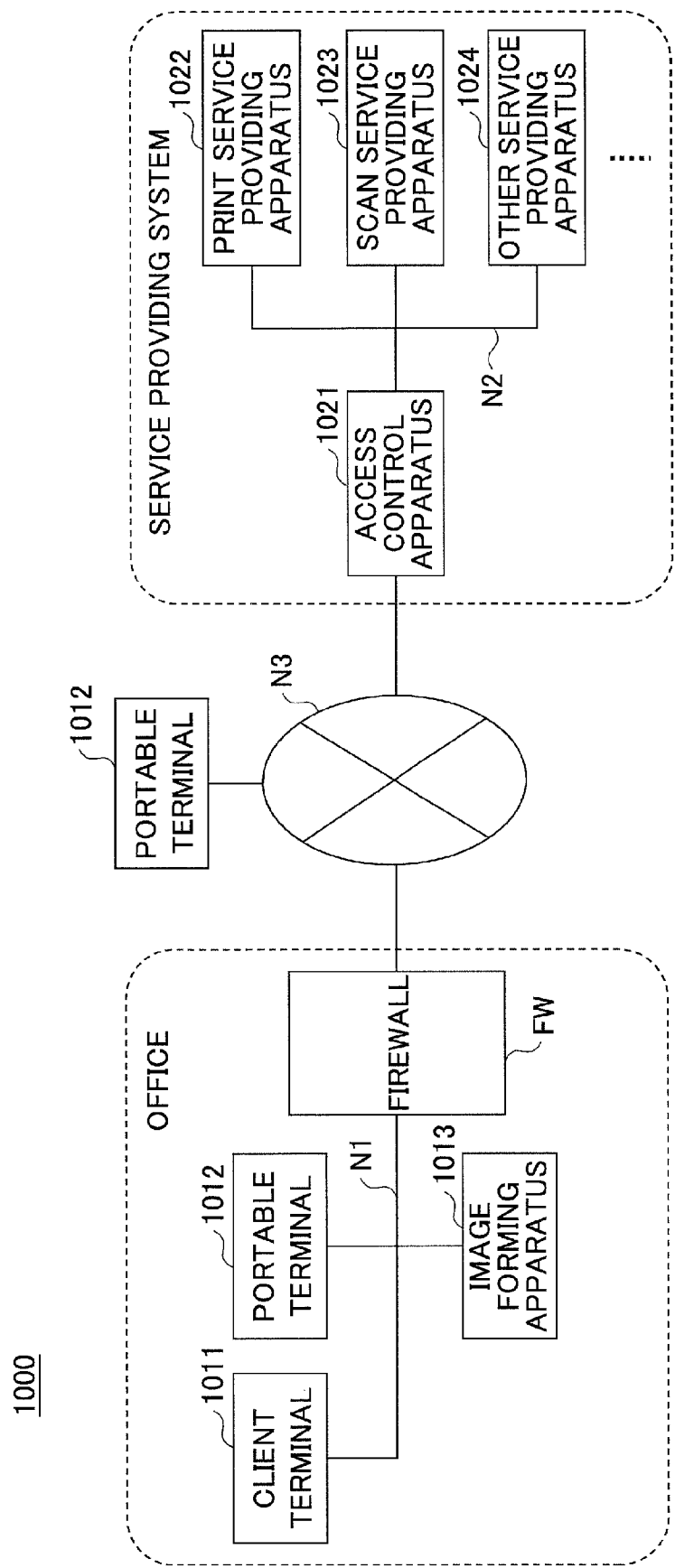
FIG. 16 illustrates an exemplary configuration of an information processing system according to a third embodiment of the present invention.

FIG. 16 illustrates an exemplary configuration of an information processing system 1000 according the third embodiment. The information processing system 1000 of FIG. 16 may include a network N1 within an office, a network N2 of a service providing system providing a service such as a cloud service, and a network N3 that may be the Internet, for example.

The network N1 may be a private network at the inner side of a firewall FW. The firewall FW may be set up at a node between the network N1 and the network N3, in order to detect and block unauthorized access. A client terminal 1011, portable terminals 1012, and an image forming apparatus 1013 such as a MFP may be connected to the network N1.

The client terminal 1011 is an example of a terminal apparatus. The client terminal 1011 may be implemented by an information processing apparatus having a general OS (Operating System) installed therein, for example. The client terminal 1011 may include a wired or wireless communication unit for establishing communication via the network N1, for example. The client terminal 1011 may be implemented by a tablet PC, a lap-top PC, or other types of terminals that may be operated by the user.

The portable terminal 1012 is an example of a terminal apparatus. The portable terminal 1012 may include a wired or wireless communication unit for establishing communication via the network N1, for example. The portable terminal 1012 may be implemented by a mobile (or cellular) phone such as a smart phone, a tablet PC, a lap-top PC, and other terminals that may be carried by the user.

The image forming apparatus 1013 is an example of an apparatus having an image forming function such as a MFP. The image forming apparatus 1013 may include a wired or wireless communication unit for establishing communication via the network N1, for example. The image forming apparatus 1013 may be an apparatus that performs a process related to image formation, such as the MFP, a copying machine, a scanner, a printer, a laser printer, a projector, an electronic blackboard, etc. In the example illustrated in FIG. 16, one client terminal 1011, one portable terminal 1012, and one image forming apparatus 1013 are provided in the network N1, however, a plurality of client terminals 1011 and/or a plurality of portable terminals 1012, and/or a plurality of image forming apparatuses 1013 may be provided in the network N1.

The client terminal 1011 and the portable terminal 1012 may correspond to the PC 12 of the first embodiment. The image forming apparatus 1013 may correspond to the MFP 13 of the first embodiment.

The network N2 may be connected to the network N3 via an access control apparatus 1021. The security of the network N2 may be protected by the access control apparatus 1021. A print service providing apparatus 1022, a scan service providing apparatus 1023, and other service providing apparatus 1024 may be connected to the network N2.

In the system 1000 illustrated in FIG. 16, the access control apparatus 1021, the print service providing apparatus 1022, the scan service providing apparatus 1023, and the other service providing apparatus 1024 may form a service providing system. This service providing system may correspond to the data conversion system 100, the print job management server 102, the reverse proxy 104, the authentication server 105, and the authentication database 106 of the first embodiment.

The access control apparatus 1021 may control login operations for gaining access to a print service provided by the print service providing apparatus 1022 and a scan service provided by the scan service providing apparatus 1023, for example.

Note that in some embodiments, each of the access control apparatus 1021, the print service providing apparatus 1022, the scan service providing apparatus 1023, and other service providing apparatus 1024 may be implemented by one or more information processing apparatuses.

In other embodiments, the access control apparatus 1021, the print service providing apparatus 1022, the scan service providing apparatus 1023, and other service providing apparatus 1024 may be integrated into a single information processing apparatus. Alternatively, functions of the access control apparatus 1021, the print service providing apparatus 1022, the scan service providing apparatus 1023, and other services providing apparatus 1024 may be distributed and implemented by a plurality of information processing apparatuses.

Also, a part of the services on the side of the network N2 may be provided at a location other than the network N2. The portable terminal 1012 may be provided in a network other than the network N1, such as the network within the office. In the system 1000 illustrated in FIG. 16, the portable terminal 1012 is provided in the network N1 and in the network N3.

<Hardware Configuration>

Figure 17:
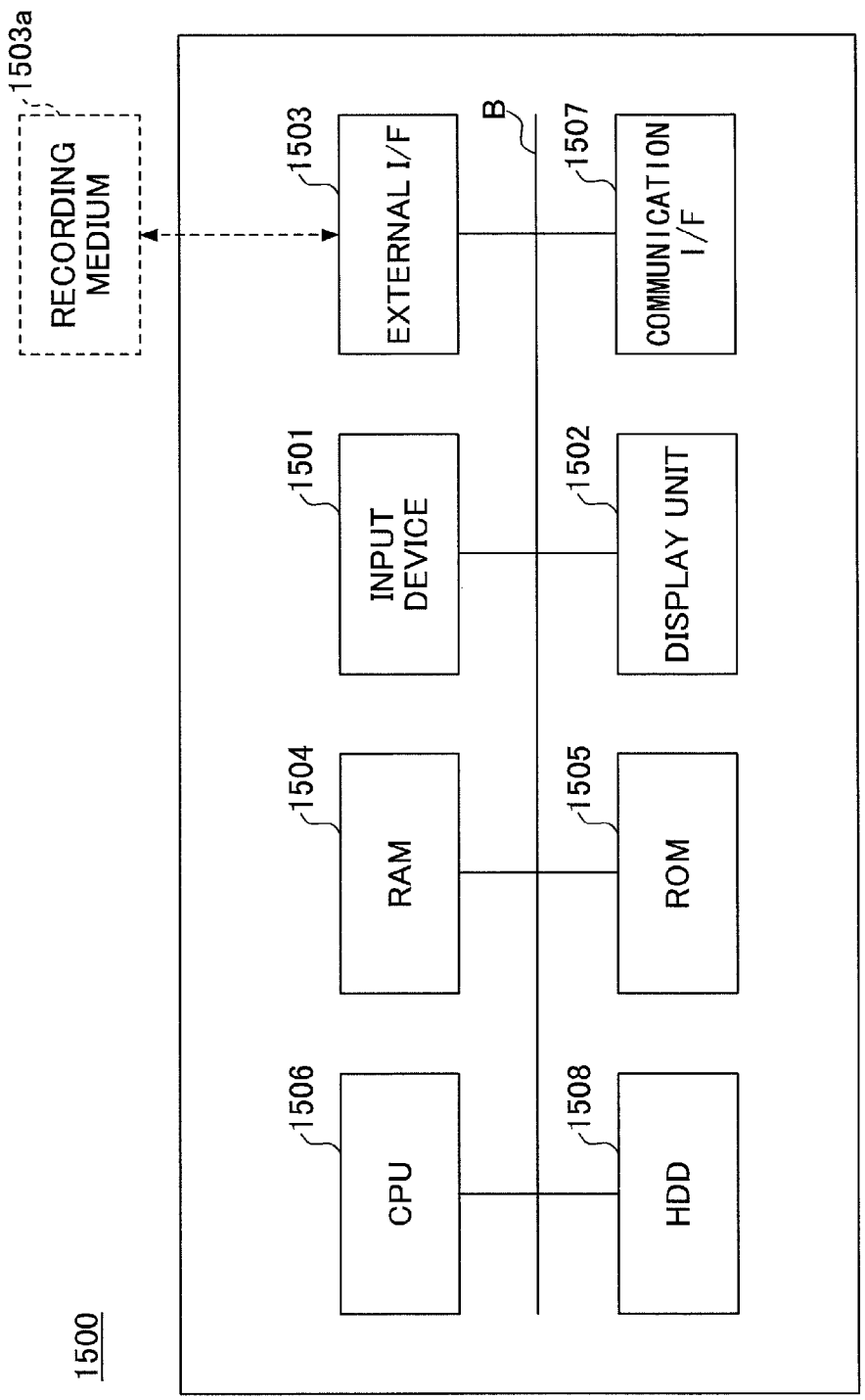
FIG. 17 is a block diagram illustrating an exemplary hardware configuration of a computer system.

Each of the client terminal 1011, the portable terminal 1012, the access control apparatus 1021, the print service providing apparatus 1022, the scan service providing apparatus 1023, and the other service providing apparatus 1024 may be implemented by a computer system having a hardware configuration as illustrated in FIG. 17, for example.

FIG. 17 is a block diagram illustrating an exemplary hardware configuration of a computer system 1500. The computer system 1500 illustrated in FIG. 17 includes an input device 1501, a display unit 1502, an external interface (I/F) 1503, a RAM (Random Access Memory) 1504, a ROM (Read Only Memory) 1505, a CPU (Central Processing Unit) 1506, a communication I/F (interface) 1507, and a HDD (Hard Disk Drive) 1508 that are connected to each other via a bus B.

The input device 1501 may include a keyboard, a mouse, a touchscreen panel, etc. The input device 1501 may be operated by the user to input various operation signals to the computer system 1500. The display unit 1502 may include a display and may be configured to display information such as a process results of the computer system 1500, for example.

The communication I/F 1507 provides an interface to connect the computer system 1500 to the networks N1 through N3. In this way, the computer system 1500 may exchange data with an external device via the communication I/F 1507.

The HDD 1508 is an example of a nonvolatile storage unit that stores programs and data. The programs and data stored in the HDD 1508 may include the OS corresponding to basic software controlling the entire computer system 1500, and application software providing various functions on the OS, for example.

The HDD 1508 may manage the programs and data stored therein in a predetermined file system and/or a database (DB). The external I/F 1503 provides an interface between the computer system 1500 and an external apparatus. The external apparatus may include a recording medium (or storage medium) 1503a. In this way, the computer system 1500 may perform a read operation and/or a write operation with respect to the recording medium 1503a via the external I/F 1503. The recording medium 1503a may be a flexible disk, a CD (Compact Disk), a DVD (Digital Versatile Disk), a SD (Secure Digital) memory card, a USB (Universal Serial Bus) memory, etc.

The ROM 1505 is an example of a nonvolatile semiconductor memory (or memory device) capable of storing programs and data even when power is turned off. The ROM 1505 may store programs and data including a BIOS (Basic Input/Output System) that is executed when starting the computer system 1500, OS settings, network settings, etc. The RAM 1504 is an example of a volatile semiconductor memory (or memory device) capable of temporarily storing programs and data.

The CPU 1506 is a processing unit that controls overall operations of the computer system 1500 by reading the programs and data from storage devices, such as the ROM 1505 and the HDD 1508, into the RAM 1504, and executing the programs, for example.

The client terminal 1011, the portable terminal 1012, the access control apparatus 1021, the print service providing apparatus 1022, the scan service providing apparatus 1023, and the other service providing apparatus 1024 may each have the hardware configuration of the computer system 1500 as described above and be configured to implement the various processes described below, for example.

<Software Configuration>

<<Service Providing System>>

Figure 18:
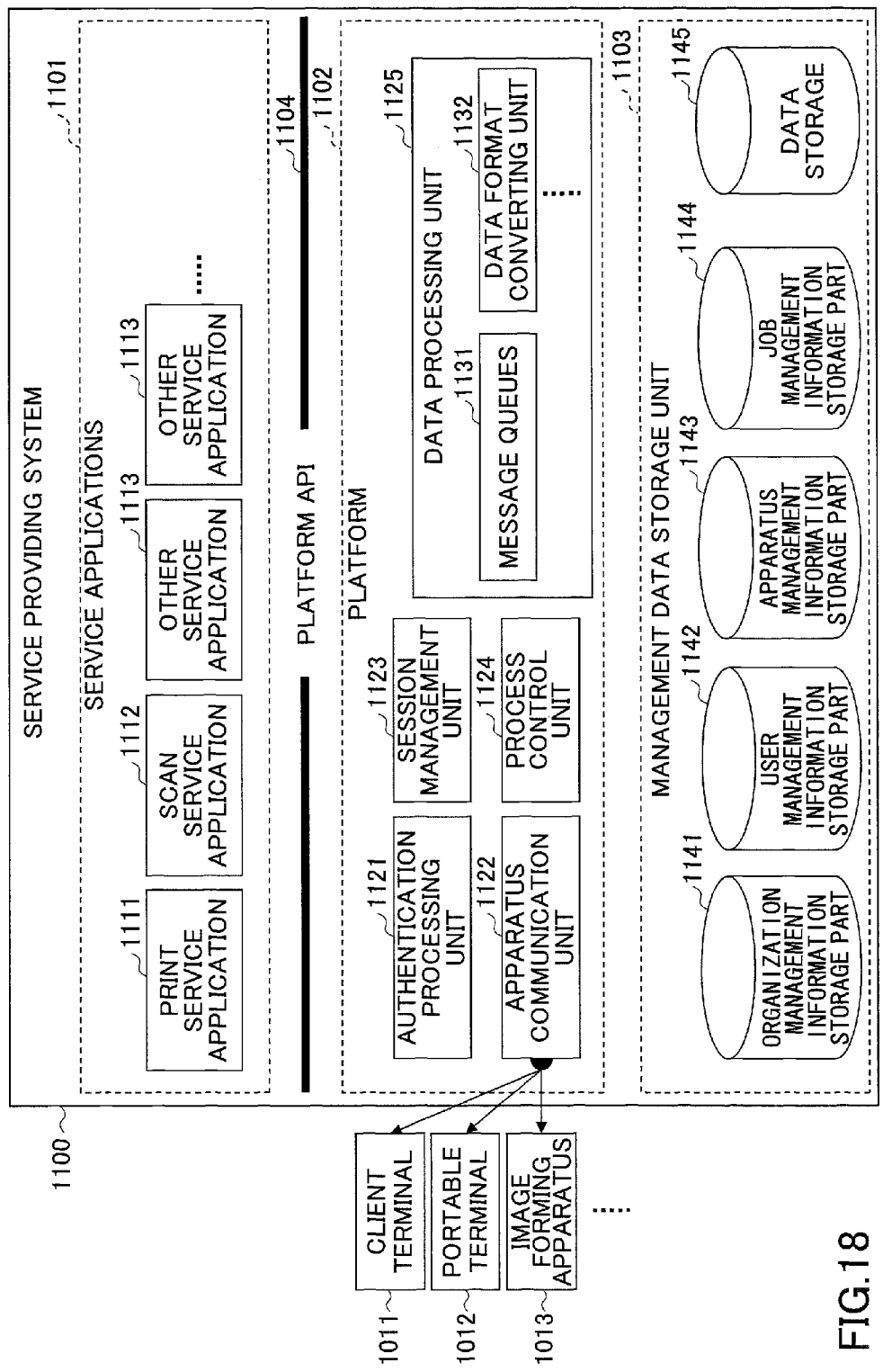
FIG. 18 is a block diagram illustrating an exemplary functional configuration of a service providing system according to the third embodiment.

The service providing system according to the third embodiment may be implemented by a software configuration as illustrated in FIG. 18, for example. FIG. 18 is a block diagram illustrating an exemplary functional configuration of a service providing system 1100 of the third embodiment.

The service providing system 1100 illustrated in FIG. 18 may implement service applications 1101, a platform 1102, a management data storage unit 1103, and a platform API (Application Programming Interface) 1104 by executing one or more programs.

The service applications 1101 may include a print service application 1111, a scan service application 1112, and one or more other service applications 1113, for example. The print service application 1111 may provide a print service. The scan service application 1112 may provide a scan service. The other service application 1113 may provide some other service.

The platform API 1104 may provide an interface to enable the service applications 1101, such as the print service application 1111, the scan service application 1112, and the other service application 113, to utilize the platform 1102. The platform API 1104 may be a predefined interface that is provided for the platform 1102 to receive the request from the service application 1101, and may be implemented by a function or a class, for example. In a case where functions of the service providing system 1100 are distributed to a plurality of information processing apparatuses, the platform API 1104 may be implemented by a Web API, for example, that may be utilized via a network.

The platform 1102 may include an authentication processing unit 1121, an apparatus communication unit 1122, a session management unit 1123, a process control unit 1124, and a data process unit 1125. The data process unit 1125 may include message queues 1131 and data format converting units 1132.

The authentication processing unit 1121 corresponds to the authentication server 105 of the first embodiment. The authentication processing unit 1121 may execute an authentication process based on a login request from an office apparatus, such as the client terminal 1011 and the image forming apparatus 1013. The office apparatus may be a generic name for the client terminal 1011, the portable terminal 1012, the image forming apparatus 1013, and other apparatuses and terminals at the office. The authentication processing unit 1121 may authenticate a user by referring to a user management information storage part 1142, which is described below. In addition, the authentication processing unit 1121 may authenticate an apparatus such as the image forming apparatus 1013 by making referring to an organization management information storage part 1141 and an apparatus management information storage part 1143, for example.

The apparatus communication unit 1122 may establish communication with an office apparatus. The session management unit 1123 may manage a session with the office apparatus. The process control unit 1124 may control a data process executed by the data process unit 1125 based on a request from the service application 1101. The data process unit 1125 may execute the data process under the control of the process control unit 1124. The process control unit 1124 may correspond to the data conversion request management unit 111 of the first embodiment. The message queues 1131 of the data process unit 1125 may correspond to the message queues 112 of the first embodiment. The data format converting unit 1132 may correspond to the converting unit 120 of the first embodiment.

The message queues 1131 may include queues corresponding to different types of data conversion processes, which are described below. Each of the message queues 1131 may be configured to receive a message of a request for data conversion from the process control unit 1124. Each of the data format converting units 1132 may be configured to monitor its corresponding queue. Upon detecting that a message has been enqueued in its corresponding queue, each of the data format converting units 1132 may be configured to perform a corresponding process such as data conversion or splitting a task included in the data conversion request, for example. Note that process operations of an asynchronous conversion service of the third embodiment are described in detail below.

The management data storage unit 1103 may include the organization management information storage part 1141, the user management information storage part 1142, the apparatus management information storage part 1143, a job management information storage part 1144, and a data storage 1145.

The organization management information storage part 1141 may store organization management information, which is described below. The user management information storage part 1142 may store user management information, which is described below. The apparatus management information storage part 1143 may store apparatus management information, which is described below. The organization management information storage part 1141, the user management information storage part 1142, and the apparatus management information storage part 1143 may correspond to the authentication database 106 of the first embodiment.

The job management information storage part 1144 may correspond to the job information management database 108 of the first embodiment and may store information relating to a data conversion request. The data storage 1145 may correspond to the shared file storage 107 of the first embodiment and may store data such as an electronic document file included in a print job, for example.

The service providing system 1100 may act as a cloud base (or cloud) that includes functions such as an authentication function and a data format converting function, and a service group that provides services such as the print service by utilizing the functions of the cloud base. For example, the cloud base may be implemented by the platform 1102, the management data storage unit 1103, and the platform API 1104. For example, the service group may be implemented by the service applications 1101.

The authentication function of the cloud base of the service providing system 1100 may be implemented by the authentication processing unit 1121 and an authentication database, for example. The authentication database may be implemented by the organization management information storage part 1141, the user management information storage part 1142, and the apparatus management information storage part 1143, for example.

The data format converting function of the cloud base of the service providing system 1100 may be implemented by the data process unit 1125, the job management information storage part 1144, and the data storage 1145, for example. The service group may provide services by utilizing the authentication function and data format converting function of the cloud base of the service providing system 1100.

Also, the service providing system 1100 illustrated in FIG. 18 may aggregate the authentication function by managing the organization management information, the user management information, and the apparatus management information as management data to be shared by the plurality of service applications 1101.

<<Management Data>>

FIG. 19 is a table illustrating an exemplary data configuration of the organization management information. The organization management information illustrated in FIG. 19 may include, as data items, an organization code, an organization name, a country, a language, and address information, for example. The organization name may be the name of an organization. The country may be the name of a country to which the organization belongs. The language may be the language used by the organization. The address information may indicate an email address of the organization.

FIG. 20 is a table illustrating an exemplary data configuration of the user management information. As illustrated in FIG. 20, the user management information may include, as data items, the organization code, a user name, a password, and address information, for example. The user name and the password may be information identifying the user. The user name may be a user ID, for example. Also, the password may optionally be omitted. The user name and the password managed under the same organization code must be unique, but the user name and the password may overlap when their organization codes differ. The address information indicates an email address of the user, for example.

In certain examples, information identifying an electronic medium (e.g., IC card) carried by the user may be used as the user ID. The electronic medium carried by the user is not limited to an IC card, and may be a mobile (or cellular) phone, a tablet terminal, an electronic book terminal, or some other type of device. The information identifying the electronic medium may be a card ID, a serial ID, a telephone number of the mobile (or cellular) phone, or profile information of the terminal, for example. A combination of two or more types of the above information may be used to identify the electronic medium as well.

FIG. 21 is a table illustrating an exemplary data configuration of the apparatus management information. As illustrated in FIG. 21, the apparatus management information may include, as data items, the organization code, device authentication information, office information, and capability, for example. The device authentication information may be used for device authentication, which involves determining whether an office apparatus satisfies predetermined conditions. The device authentication information may be an ID indicating that the office apparatus has a specific application installed therein, or an apparatus number identifying the office apparatus, for example. The office information may indicate an office in which the office apparatus is set up, for example. The capability may indicate the capability of the office apparatus, for example.

<Process Operations>

In the following, detailed process operations of the service providing system 1100 according to the third embodiment are described. Note that features of the present embodiment that may be identical to those of the first embodiment are given the same reference numerals and their descriptions may be omitted.

<<Data Conversion Process>>

Figure 22:
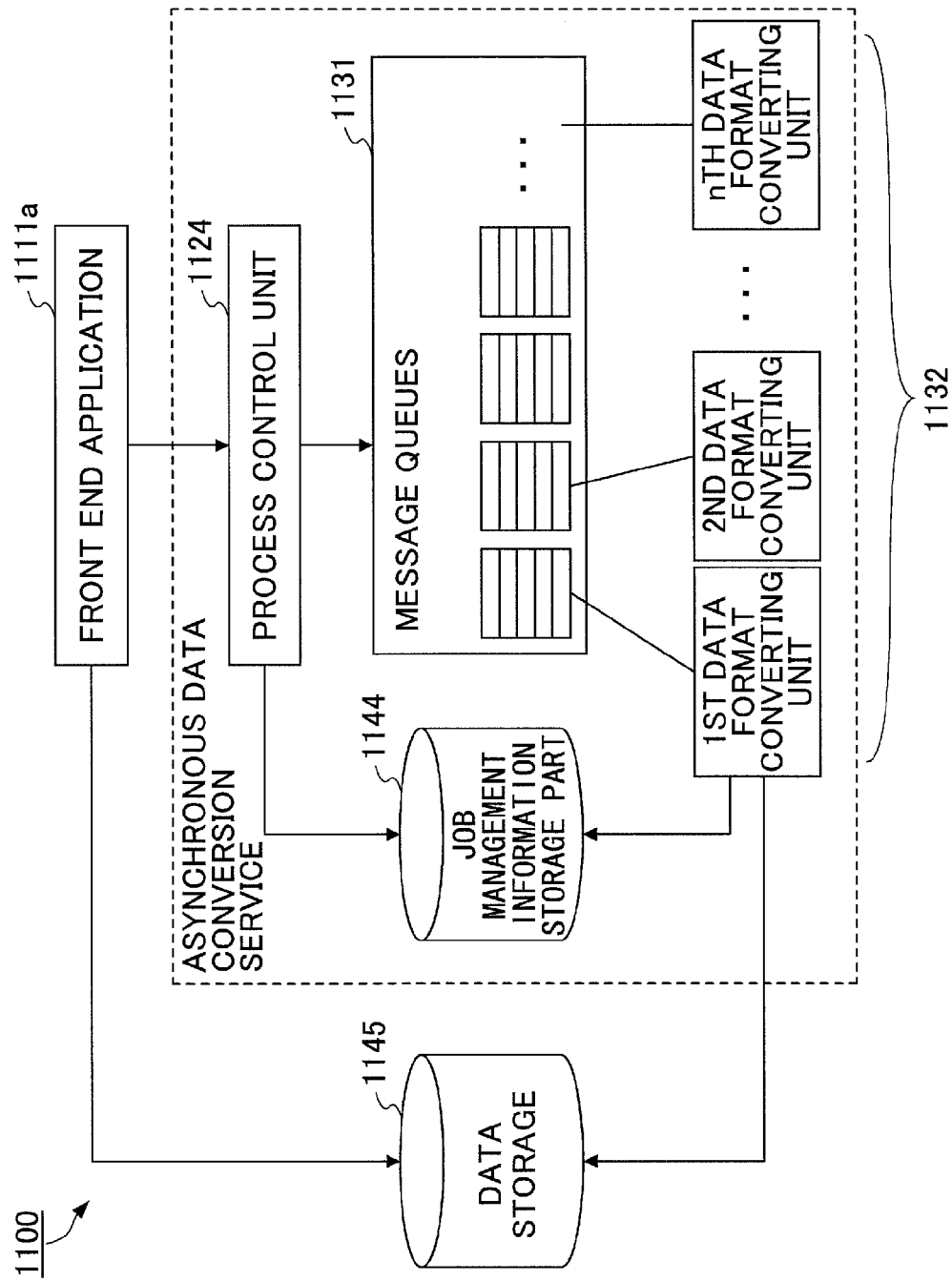
FIG. 22 illustrates an exemplary data conversion process according to the third embodiment.

The service providing system 1100 of the third embodiment may have the following configuration in order to accommodate various types of data conversion requests and to flexibly adapt to an increase in the number of types of the data conversion requests. FIG. 22 illustrates an exemplary functional configuration of a data conversion process implemented in the service providing system 1100. FIG. 22 illustrates an exemplary process flow of the data conversion process according to the third embodiment. Note that many features illustrated in FIG. 22 may be substantially identical to those illustrated in FIG. 4 so that overlapping descriptions may be omitted.

As illustrated in FIG. 22, the service providing system 1100 may include a front end application 1111*a* that is a function of the print service application 1111, a data storage 1145, a process control unit 1124, message queues 1131, a job management information storage part 1144, and a plurality of data format converting units 1132.

The process control unit 1124, the message queues 1131, the job management information storage part 1144, and the plurality of data format converting units 1132 may provide asynchronous data conversion services. In a cloud printing solution, the front end application 1111*a* may have functions to receive a print job from the input end apparatus, such as the client terminal 1011, and to register data such as an electronic document file included in the print job in the data storage 1145. The front end application 1111*a* may determine a required file conversion and control the asynchronous data conversion services to execute data conversion processes.

The converted file may be registered in the data storage 1145. When an output instruction for the print job is received from an output end apparatus such as the image forming apparatus 1013, the print service application 1111 may send the converted file registered in the data storage 1145 to the image forming apparatus 1013 corresponding to the sender of the output instruction.

The front end application 1111*a* may include a function to determine a file conversion required for executing the output instruction. The front end application 1111*a* may embed the type of data conversion required, as a parameter such as "doc2rpcs", for example, in a data conversion request to be sent to the process control unit 1124. Similarly, the front end application 1111*a* may embed the URI of data (source data) to be subject to the data conversion, as a parameter indicating the location of the data in the data conversion request.

The process control unit 1124 may receive the data conversion request including at least the type of data conversion and the URI of the data. The process control unit 1124 may analyze the data conversion request, and enqueue a message in a queue of the message queues 1131 with the matching type of data conversion.

At the same time, the process control unit 1124 may register the information of the data conversion request in the job management information storage part 1144 in parallel with the above operation of enqueuing the message in a queue of the message queues 1131. The information of the data conversion request registered in the job management information storage part 1144 may include the location of the file (URI in the data storage 1145), the type of data conversion included in the data conversion request, and the status of the data conversion request, for example. The status of the data conversion request may be indicated as "accepted", "executing", "completed", etc. The status of the data conversion request may represent a status or progress of the data conversion process.

The message queues 1131 may include queues corresponding to the plurality of data format converting units 1132. FIG. 22 illustrates an example in which each data format converting unit 1132 and each queue of the message queues 1131 correspond to each other on a one-to-one basis; however, in alternative examples, two or more data format converting units 1132 may correspond to two or more queues of the message queue 1131. In other words, the correspondence between the data format converting units 1132 and the queues of the message queue 1131 may be one-to-one or many-to-many.

Each data format converting unit 1132 may monitor its corresponding queue of the message queues 1131. Upon detecting that a message has been enqueued in its corresponding queue, the data format converting unit 1132 may perform a corresponding process such data conversion or splitting the data conversion request according to the enqueued message, for example.

In the case of performing a data conversion process, for example, the data format converting unit 1132 may acquire data stored in the data storage 1145, based on the URI of the data included in the message, and convert the acquired data. The data format converting unit 1132 may register the converted data in the data storage 1145, and update the information of the data conversion request registered in the job management information storage part 1144.

In the case of splitting the data conversion request, the data format converting unit 1132 may split the data conversion request into multiple data conversion processes to be executed in multiple stages and convert the data conversion request into multiple jobs corresponding to the multiple processes. As described above, at least one of the plurality of data format converting units 1132 of the present embodiment may be configured to perform a process of splitting a data conversion request rather than performing a data conversion process. Note that the process of splitting a data conversion request is described in greater detail below.

The data conversion processes are split based on conversion engines included in the asynchronous data conversion service. The multiple jobs into which the data conversion request is split are enqueued in corresponding queues of the message queues 1131 according to the types of data conversion. Then, corresponding data conversion processes may be performed in a manner similar to the data conversion process described above.

Figure 23:
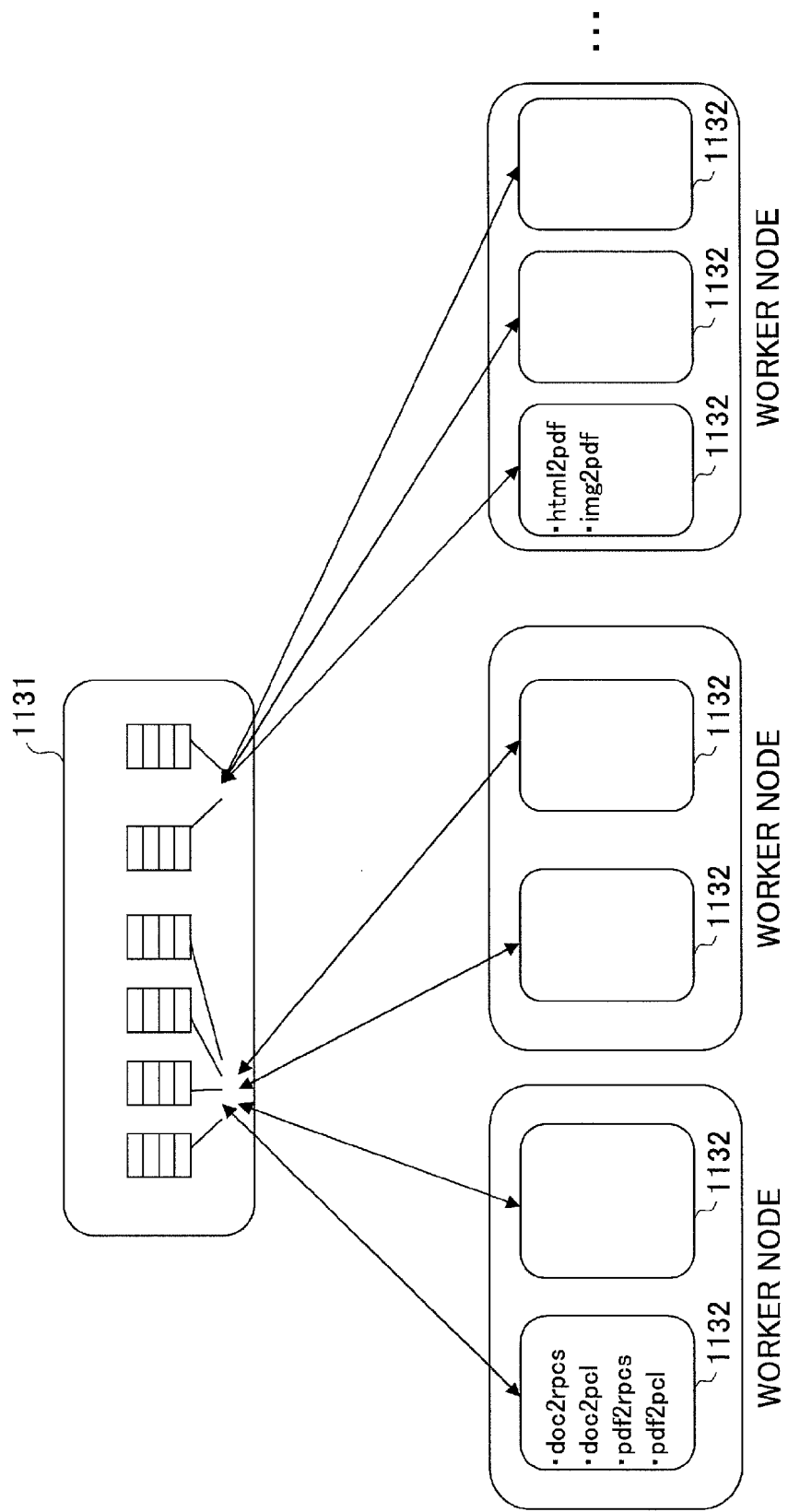
FIG. 23 illustrates an exemplary correspondence between queues and data format converting units.

The correspondence between the queues of the message queues 1131 and the data format converting units 1132 may be set up as illustrated in FIG. 23, for example. FIG. 23 illustrates an exemplary correspondence between queues and data format converting units.

The message queues 1131 include a plurality of queues. The queues may be divided according to different types of data conversion processes, such as "doc2rpcs," "doc2 pcl," etc. The data format converting units 1132 may operate on a Worker Node. For example, the Worker Node may be implemented by a WINDOWS (registered trademark) server or a LINUX (registered trademark) server.

In one example, two data format converting units 1132 may be arranged to operate on a single WINDOWS server, while three data format converting units 1132 may be arranged to operate on a single LINUX server.

In FIG. 23, the data format converting units 1132 operating on a WINDOWS (registered trademark) server are configured to perform data conversion processes "doc2rpcs," "doc2 pcl," "pdf2rpcs," and "pdf2 pcl." Also, the data format converting units 1132 operating on the LINUX server are configured to perform data conversion processes "html2pdf" and "img2pdf."

As illustrated in FIG. 23, the data format converting unit 1132 may perform polling of jobs enqueued in a plurality of queues through a single connection. However, the plurality of queues that may be polled by the data format converting unit 1132 in a single connection may be restricted to the corresponding queues of the data format converting units 1132 operating on the same OS server, for example.

Figure 24:
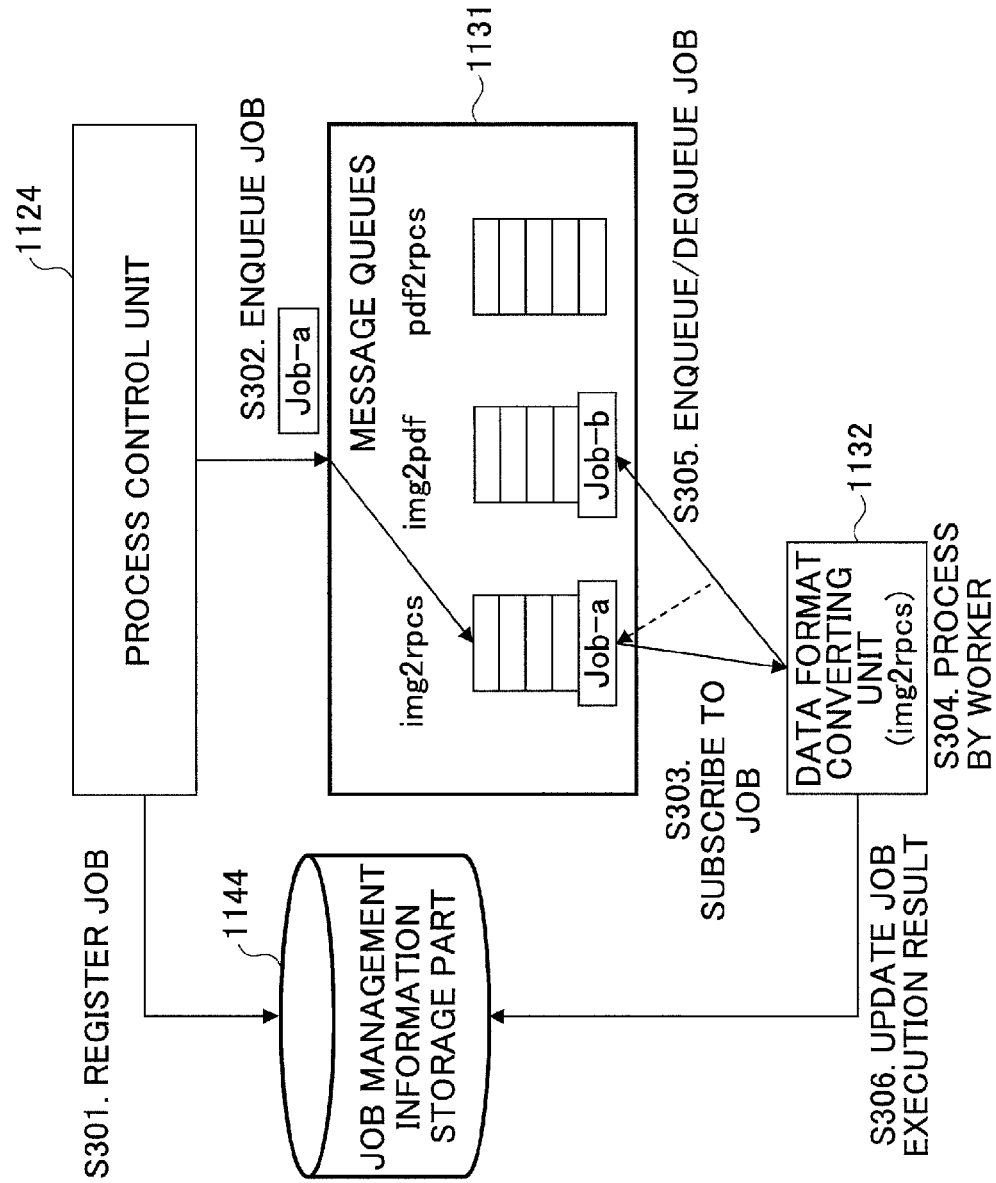
FIG. 24 illustrates exemplary process steps of a process of splitting a data conversion request.
Figure 25:
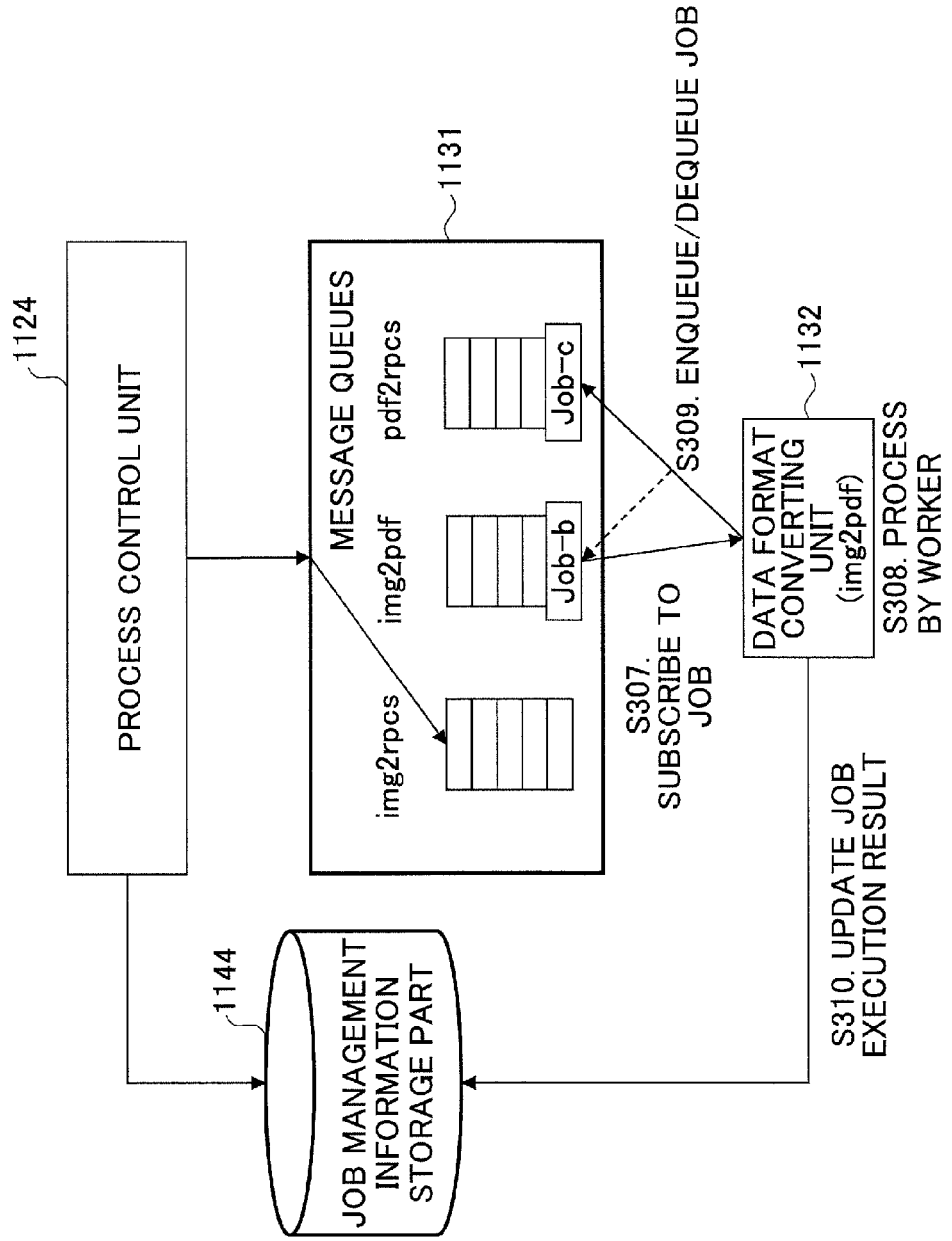
FIG. 25 illustrates further exemplary process steps of the process of splitting the data conversion request.
Figure 26:
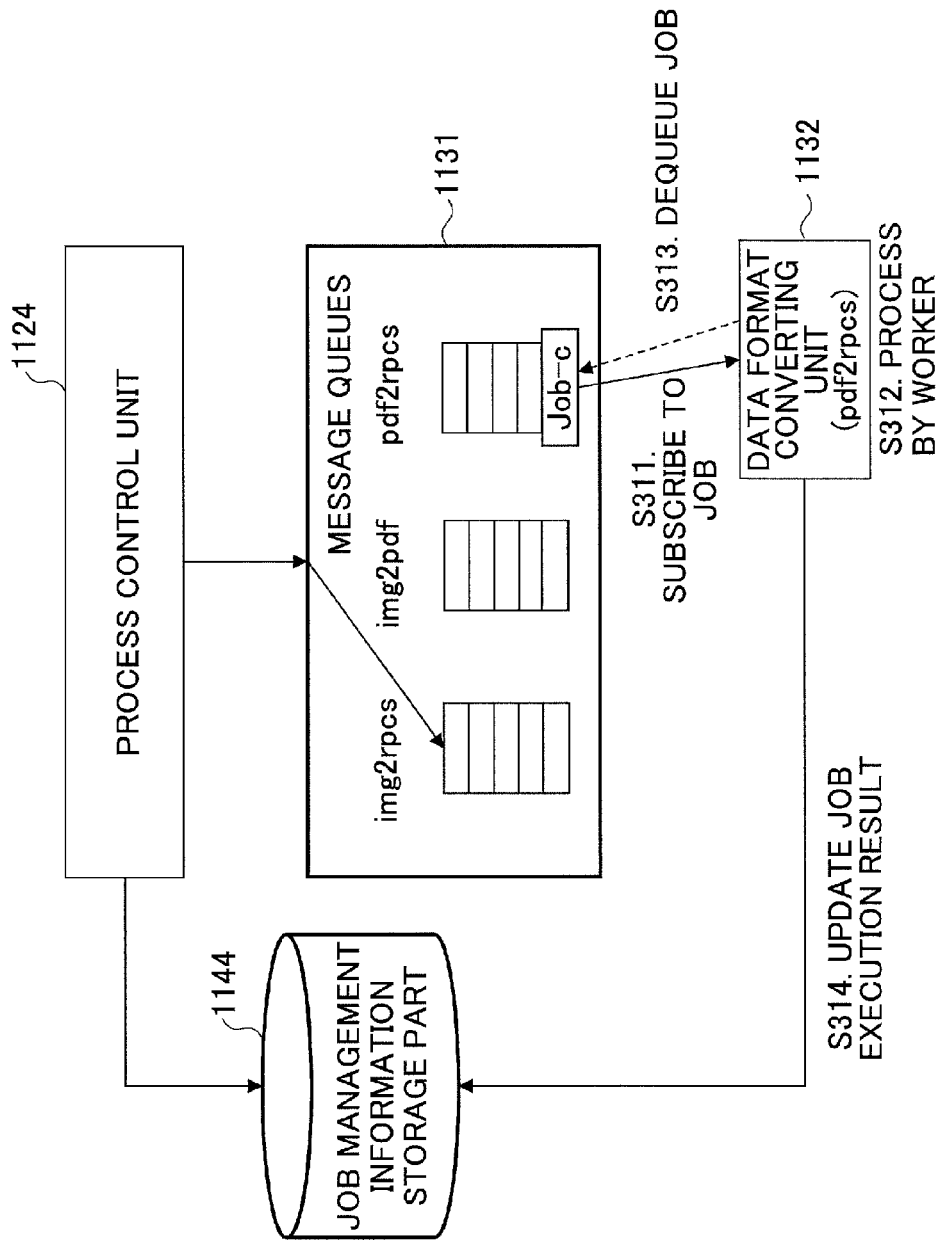
FIG. 26 illustrates further exemplary process steps of the process of splitting the data conversion request.

In the following, a process of splitting a data conversion request for the data conversion process "img2rpcs" is described as an exemplary process of splitting a data conversion request. FIGS. 24-26 illustrate exemplary process steps of the process of splitting the data conversion request.

Note that the illustrated process from step S301 of FIG. 24 and thereafter may be performed after the process control unit 1124 receives from the front end application 1111a the data conversion request including at least the type of data conversion "img2rpcs" and the URI of the data.

In step S301, the process control unit 1124 may register the data conversion request received from the front end application 1111a, as a job, in the management information storage part 1144.

In step S302, the process control unit 1124 may submit (or enqueue) the data conversion request received from the front end application 1111a, as a job ("Job-a"), in the queue corresponding to the type of data conversion "img2rpcs".

The data format converting unit 1132 corresponding to the type of data conversion "img2rpcs" monitors its corresponding queue, and in step S303, acquires the job "Job-a" enqueued in the corresponding queue (subscribes to job). In step S304, the data format converting unit 1132 may perform a process corresponding to the acquired job "Job-a".

In the following, detailed process operations of the data format converting unit 1132 in step S304 are described with reference to FIG. 27. FIG. 27 illustrates exemplary process operations of step S304. Note that in FIG. 27, the data format converting unit 1132 is identified as a Worker. Also, FIG. 27 illustrates states of virtual task queues. A virtual task queue refers to a sequence (or queue) held within the Worker.

In (1) of FIG. 27, the task queue includes a task "img2rpcs" corresponding to the job "Job-a" acquired by the data format converting unit 1132. In (2) of FIG. 27, the data format converting unit 1132 corresponding to the type of data conversion "img2rpcs" adds, to the task queue, tasks "img2pdf" and "pdf2rpcs" that are required to perform the data conversion from the image file to the RPCS.

In (3) of FIG. 27, the data format converting unit 1132 checks the first task "img2rpcs" at the front (or head) of the task queue, and deletes (dequeues) the job "Job-a" from the queue corresponding to the type of data conversion "img2rpcs".

In (4) of FIG. 27, the data format converting unit 1132 deletes the task "img2rpcs" at the front of the task queue. Then, in (5) of FIG. 27, the data format converting unit 1132 checks the task "img2pdf" at the front of the task queue, and enqueues a job "Job-b" into the queue corresponding to the type of data conversion "img2pdf".

The deletion of the job "Job-a" in (3) of FIG. 27 and the enqueueing of the job "Job-b" in (5) of FIG. 27 may be performed by the process of step S305 illustrated in FIG. 24.

Referring back to FIG. 24, after the job "Job-a" is deleted and the job "Job-b" is enqueued in step S305 (enqueue/dequeue job), the data format converting unit 1132 corresponding to the type of data conversion "img2rpcs" may write an execution result of the job "Job-a" to the job management information storage part 1144 in step S306. After the execution result of the job "Job-a" is written in step S306, the job management information may have a data configuration as illustrated in FIG. 28, for example.

FIG. 28 illustrates an exemplary data configuration of the job management information after the execution result of the job "Job-a" is written. As illustrated in FIG. 28, "character string indicating that task has been split" is written, as the execution result, into the job management information. Note also that the status of the data conversion process "img2rpcs" is indicated as "doing" meaning the data conversion process "img2rpcs" is being executed.

In step S307 of FIG. 25, the data format converting unit 1132 corresponding to the type of data conversion "img2rpcs" may acquire the job "Job-b" enqueued in the queue that is being monitored (subscribe to job). In step S308, the data format converting unit 1132 may perform a process corresponding to the job "Job-b".

In the following, the process operations of the data format converting unit 1132 in step S308 are described in detail with reference to FIG. 29. FIG. 29 illustrates exemplary process operations of step S308.

In (1) of FIG. 29, the task queue includes tasks "img2pdf" and "pdf2rpcs". In (2) of FIG. 29, the data format converting unit 1132 corresponding to the type of data conversion "img2pdf" checks the first task "img2pdf" at the front of the task queue, and performs a process that includes acquiring the file from the data storage 1145, opening the file, converting the data of the file, uploading the file, and deleting (dequeueing) the job "Job-b".

In (3) of FIG. 29, the data format converting unit 1132 deletes the first task "img2pdf" at the front of the task queue. In (4) of FIG. 29, the data format converting unit 1132 checks the first task "pdf2rpcs" at the front of the task queue, and enqueues a job "Job-c" into the queue corresponding to the type of data conversion "pdf2prcs".

The deletion of the job "Job-b" in (2) of FIG. 29 and the enqueueing of the job "Job-c" in (4) of FIG. 29 may be performed by the process of step S309 illustrated in FIG. 25.

Referring back to FIG. 25, after the job "Job-b" is deleted and the job "Job-c" is enqueued (enqueue/dequeue job) in step S309, the data format converting unit 1132 corresponding to the type of data conversion "img2pdf" may write an execution result of the job "Job-b" to the job management information storage part 1144 in step S310. After the execution result of the job "Job-b" is written in step S310, the job management information may have a data configuration as illustrated in FIG. 30, for example.

FIG. 30 illustrates an exemplary data configuration of the job management information after the execution result of the job "Job-b" is written. As illustrated in FIG. 30, the job management includes, as the execution result, information "A.pdf of Data Storage" indicating the location of the converted file in the data storage 1145. In this example, the status is indicated as "doing" meaning the data conversion process "img2rpcs" is being executed.

In step S311 of FIG. 26, the data format converting unit 1132 corresponding to the type of data conversion "pdf2rpcs" may acquire the job "Job-c" enqueued in the queue that is being monitored (subscribe to job). In step S312, the data format converting unit 1132 may perform a process corresponding to the job "Job-c".

In the following, operations of the data format converting unit 1132 in step S312 are described in greater detail with reference to FIG. 31. FIG. 31 illustrates exemplary process operations of step S312.

In (1) of FIG. 31, the task queue includes task "pdf2rpcs". In (2) of FIG. 31, the data format converting unit 1132 corresponding to the type of data conversion "pdf2rpcs" checks the first task "pdf2rpcs" at the front of the task queue, and performs a process that includes acquiring the file from the data storage 1145, opening the file, converting the data of the file, uploading the file, and dequeueing the job "Job-c".

In (3) of FIG. 31, the data format converting unit 1132 deletes the first task "pdf2rpcs" at the front of the task queue. When the task "pdf2rpcs" is deleted, the task queue becomes empty. The dequeuing of the job "Job-c" in (2) of FIG. 31 may correspond to step S313 of FIG. 26.

Referring back to FIG. 26, after the job "Job-c" is dequeued in step S313, the data format converting unit 1132 corresponding to the type of data conversion "pdf2rpcs" may write the execution result of the job "Job-c" to the job management information storage part 1144 in step S314. After the execution result of the job "Job-c" is written in step S314, the job management information may have a data configuration as illustrated in FIG. 32, for example.

FIG. 32 illustrates an exemplary data configuration of the job management information after the execution result of the job "Job-c" is written. In FIG. 32, the job management includes, as the execution result, information "A.rpcs of Data Storage" indicating the location of the converted file in the data storage 1145. In this example, the status is indicated as "done" meaning the data conversion process "img2rpcs" is completed.

According to an aspect of the present embodiment, a data conversion process may be executed through cooperation of a plurality of data format converting units 1132. Thus, even when data format options before conversion and/or after conversion are increased, the number of data conversion engines that need to be prepared to accommodate for such an increase may be reduced compared to a conventional data conversion system. That is, the present embodiment may flexibly adapt to an increase in the number of types of data formats that need to be handled as data formats before conversion and/or after conversion.

Note that although a data conversion process is described above as an exemplary application of the third embodiment, aspects of the third embodiment may also be applied to other various types of processes such as a process of performing an OCR process on an image file and storing the processed file in an online storage as described above in connection with the second embodiment. In this case, the data format converting units 1132 may be replaced by the executing units 220 as described above in connection with the second embodiment.

In one preferred embodiment, the executing units 220 may be configured to execute a process requested by a process execution request, and also execute a next process that is expected to be requested (e.g., preview process) in the background, for example.

In another preferred embodiment, the converting units 120 of the first embodiment, the executing units 220 of the second embodiment, and the data format converting units 1132 of the third embodiment may be configured to cooperatively execute a process. In this way, for example, the following processes may be performed:

process of converting image/text/HTML/document/PDF file into a print file process of performing an OCR process on an image file of an image scanned by the image forming apparatus 1013 and storing the processed file in the online storage 14 process of acquiring a file stored in the online storage 14 and converting the acquired file into a print file process of acquiring an image file stored in the online storage 14 and performing an OCR process on the acquired image file Fourth Embodiment In the above first through third embodiments, jobs are processed in the order in which they are received. In contrast, in a fourth embodiment of the present invention, certain jobs may be given higher priority over other jobs and jobs may be processed based on priority. For example, users may be divided into general users and premium users, and jobs of premium users may be prioritized over jobs of general users. In another example, jobs may be divided into jobs requiring a short processing time and jobs requiring a long processing time, and the jobs requiring a short processing time may be prioritized over jobs requiring a long processing time.

Note that the fourth embodiment is described below with reference to an exemplary case of assigning priority to the processing order of jobs in the data conversion system according the first embodiment. However, priority may similarly be assigned to jobs in the process execution system of the second embodiment and the data conversion system of third embodiment, for example. Note that features of an exemplary data conversion system according to the fourth embodiment that may be identical to those of the first embodiment are given the same reference numerals and their descriptions may be omitted.

First, referring to FIG. 33, the data conversion system 100 that does not assign priority to the processing order of jobs is described. FIG. 33 is a block diagram illustrating an exemplary configuration of the data conversion system 100 that does not assign priority to the processing order of jobs.

Note that the data conversion system 100 illustrated in FIG. 33 corresponds to the data conversion system 100 illustrated in FIG. 4. However, in FIG. 33, illustrations of the shared file storage 107 and the job information management database 108 are omitted, and the converting units 120 are represented as workers 120.

As illustrated in FIG. 33, the data conversion system 100 has jobs registered in the message queues 112 and has the workers 120 process the jobs one by one. In the example illustrated in FIG. 33, the message queues 112 include queues corresponding to the types of data conversion "doc2rpcs" and "pdf2rpcs". Also, in FIG. 33, the workers 120 are configured to be capable of executing the data conversion processes "doc2rpcs" and "pdf2rpcs".

The front end application 102a embeds a parameter indicating a required type of data conversion such as "type=doc2rpcs" in a data conversion request (job) to be sent to the asynchronous conversion server 101.

The data conversion request management unit 111 of the asynchronous conversion server 101 that receives the data conversion request analyzes the received data conversion request and enqueues the job (message) in the queue of the message queues 112 corresponding to the type of data conversion "doc2rpcs" matching the type of data conversion included in the data conversion request.

In the following descriptions, it is assumed that "Job-1" and "Job-3" are jobs of general users, and "Job-2" and "Job-4" are jobs of premium users. As illustrated in FIG. 33, in the data conversion system 100 that does not assign priority to the processing order of jobs, the jobs of generals users and the jobs of premium users are all enqueued in the same queue and the jobs are processed in the order in which they are enqueued in the queue. Note that such indiscriminate processing of jobs may similarly be implemented in a case where there are jobs requiring a short processing time and jobs requiring a long processing time, for example.

That is, the workers 120 monitor the queues corresponding to the types of data conversions "doc2rpcs" and "pdf2rpcs" and process the jobs in the order in which they are enqueued in the queues being monitored.

Next, referring to FIG. 34, the data conversion system 100 that assigns priority to the processing order of jobs is described. FIG. 34 is a block diagram illustrating an exemplary configuration of the data conversion system 100 that assigns priority to the processing order of jobs.

Note that the data conversion system 100 illustrated in FIG. 34 corresponds to the data conversion system 100 illustrated in FIG. 4. However, in FIG. 34, illustrations of the shared file storage 107 and the job information management database 108 are omitted, and the converting units 120 are represented as workers 120.

The message queues 112 of the data conversion system 100 illustrated in FIG. 34 include queues for general users and queues for premium users. That is, in FIG. 34, the message queues 112 include queues for general users corresponding to the types of data process "doc2rpcs" and "pdf2rpcs", and queues for premium users corresponding to the types of data process "doc2rpcs" and "pdf2rpcs".

Note that in FIG. 34, the queue for general users corresponding to the type of data conversion "doc2rpcs" is represented as queue "doc2rpcs". The queue for general users corresponding to the type of data conversion "pdf2rpcs" is represented as queue "pdf2rpcs".

Also, the queue for premium users corresponding to the type of data conversion "doc2rpcs" is represented as queue "doc2rpcs prem". The queue for premium users corresponding to the type of data conversion "pdf2rpcs" is represented as queue "pdf2rpcs prem".

Also, the data conversion system 100 illustrated in FIG. 34 includes workers 120 prioritizing premium users and a worker 120 prioritizing general users. Note that in FIG. 34, the workers 120 prioritizing premium users and the worker 120 prioritizing general users are capable of performing the same types of data conversion processes but differ in the manner they select jobs to be processed from the queues.

For example, in FIG. 34, the worker 120 prioritizing general users gives priority to processing jobs enqueued in the queues for general users. The workers 120 prioritizing premium users give priority to processing jobs enqueued in the queues for premium users. Note that in each of the workers 120 illustrated in FIG. 34, the queues of the message queues 112 are listed according to the order of priority in which they are to be processed.

As illustrated in FIG. 34, by providing a greater number of workers 120 prioritizing premium users compared to the number of workers 120 prioritizing general users, processing of a job enqueued in a queue for premium users may be prioritized over a job enqueued in a queue for general users even in a case where the job in the queue for general users is enqueued earlier.

Note that in a case where no job is enqueued in the queues for premium users, the workers 120 prioritizing premium users may process jobs enqueued in the queues for general users. In this way, a situation in which the workers 120 remain idle even when jobs to be processed are enqueued may be avoided and operation efficiency may be improved.

Similarly, in a case where no jobs are enqueued in the queues for general users, the worker 120 prioritizing general users may process jobs enqueued in the queues for premium users. In this way, a situation in which the worker 120 remains idle even when jobs to be processed are enqueued may be avoided and operation efficiency may be improved.

The front end application 102a embeds a parameter indicating a required type of data conversion such as "type=doc2rpcs" in a data conversion request (job) to be sent to the asynchronous conversion server 101.

The data conversion request management unit 111 of the asynchronous conversion server 101 that receives the data conversion request analyzes the received data conversion request and determines whether the data conversion request is from a general user or a premium user. The determination of whether the data conversion request is from a general user or a premium user may be made based on an identifier included in the data conversion request or user identification information such as a user ID included in the data conversion request, for example. In one example, user identification information such as a user ID may be registered in the authentication database 106 in association with information indicating whether the user is a general user or a premium user. In this way, a general user may be prevented from impersonating as a premium user, for example.

In a case where the data conversion request management unit 111 determines that the data conversion request is from a general user, the data conversion request management unit 111 sorts (enqueues) the job (message) into a queue for general users corresponding to the type of data conversion matching the type of data conversion included in the data conversion request. In a case where the data conversion request management unit 111 determines that the data conversion request is from a premium user, the data conversion request management unit 111 sorts the job into a queue for premium users corresponding to the type of data conversion matching the type of data conversion included in the data conversion request.

In the example illustrated in FIG. 34, "Job-1" through "Job-3" as jobs from generals users are sorted into the queue "doc2rpcs" for general users. Also, "Job-1" through "Job-5" as jobs from premium users are sorted into the queue "doc2rpcs prem". The job "Job-1" sorted into the queue for general users is being processed by the worker 120 prioritizing general users. The jobs "Job-1" through "Job-3" sorted into the queue for premium users are being processed by the workers 120 prioritizing premium users.

In the data conversion system 100 that assigns priority to the processing order of jobs, a job of a general user and a job of a premium user may be enqueued in different queues so that processing of the job of the premium user may be prioritized over the job of the general user.

Note that although the data conversion request management unit 111 is configured to sort jobs into different queues based on the type of user in the above example, the data conversion request management unit 111 may also be configured to sort jobs into different queues based on other factors such as the type of organization (e.g., whether an organization issuing the data conversion request corresponds to a general organization or a premium organization).

According to an aspect of the present embodiment, the processing order of jobs may be altered based on priority assigned to the jobs. For example, by assigning priority to processing jobs of premium users over jobs of general users, utility value of premium users may be improved, for example. Also, by assigning priority to processing jobs requiring a short processing time over jobs requiring a long processing time, a situation may be avoided in which a job requiring only a short processing time has to wait for the completion of a job requiring a long processing time and user convenience may be improved, for example.

Although the present invention has been described above with reference to certain embodiments, the present invention is not limited to these embodiments, and numerous variations and modifications may be made without departing from the scope of the present invention. Note that an executing unit of the present invention may be implemented by the converting unit 120, the executing unit 220, or the data format converting unit 1132 of the above-described embodiments, for example. A managing unit of the present invention may be implemented by the data conversion request management unit 111, the process execution request management unit 211, or the process control unit 1124 of the above-described embodiments, for example. A storing unit of the present invention may be implemented by the message queues 112, 212, and 1131 of the above-described embodiments, for example. A data storage device of the present invention may be implemented by the online storage 14 of the above-described embodiments, for example.

What is claimed is:

1. A process execution method implemented by an information processing system including at least one information processing apparatus, the process execution method comprising:

a managing step of sorting a process execution request based on a type of process of the process execution request;

a storing step of storing in a storing unit the sorted process execution request according to the type of process of the process execution request; and an executing step of having a plurality of executing units execute a process corresponding to the process execution request stored in the storing unit;

wherein, upon the information processing system determining that the process corresponding to the process execution request cannot be executed by only one of the plurality of executing units, at least one executing unit of the plurality of executing units is configured to split the process corresponding to the process execution request stored in the storing unit into a plurality of processes to be executed by at least two other executing units of the plurality of executing units and store in the storing unit a split process execution request including the split processes for prompting the other executing units to cooperatively execute the split processes, wherein the process includes a data conversion process corresponding to a data process execution request, and wherein the at least one executing unit of the plurality of executing units is further configured to split the data conversion process into a plurality of data conversion processes upon determining that the process corresponding to the process execution request cannot be executed by only one of the plurality of executing units.

2. An information processing system including at least one information processing apparatus, the information processing system comprising:

a managing unit that sorts a process execution request based on a type of process of the process execution request;

a storing unit having a memory that stores the sorted process execution request according to the type of process of the process execution request; and a plurality of executing units that are configured to execute a process corresponding to the process execution request stored in the storing unit;

wherein, upon the information processing system determining that the process corresponding to the process execution request cannot be executed by only one of the plurality of executing units, at least one executing unit of the plurality of executing units is configured to split the process corresponding to the process execution request stored in the storing unit into a plurality of processes to be executed by at least two other executing units of the plurality of executing units and store in the storing unit a split process execution request including the split processes for prompting the other executing units to cooperatively execute the split processes, wherein the process includes a data conversion process corresponding to a data process execution request, and wherein the at least one executing unit of the plurality of executing units is further configured to split the data conversion process into a plurality of data conversion processes upon determining that the process corresponding to the process execution request cannot be executed by only one of the plurality of executing units.

3. The information processing system as claimed in claim 2, wherein the other executing units are configured to execute one of the split processes corresponding to the split process execution request stored in the storing unit by the at least one executing unit and store an unexecuted process execution request including at least one unexecuted process of the split processes in the storing unit.

4. The information processing system as claimed in claim 2, wherein the plurality of executing units include a plurality of converting units that are configured to execute predetermined data conversion from one data format to another data format; and a splitting unit that is configured to split the data conversion process corresponding to the data conversion process execution request into the plurality of data conversion processes to be executed by at least two of the converting units and store in the storing unit a split data conversion process execution request including the split data conversion processes for prompting the at least two converting units to cooperatively execute the split data conversion processes.

5. The information processing system as claimed in claim 2, wherein the plurality of executing units include a plurality of processing units that are configured to perform a predetermined process on electronic data or store electronic data in a predetermined data storage device; and a splitting unit that is configured to split a process execution request for a process of performing the predetermined process on electronic data and storing the processed electronic data in the predetermined data storage device into a plurality of processes to be executed by the processing units including a process of performing the predetermined process on the electronic data and a process of storing the processed electronic data in the predetermined data storage device, the split process execution request being stored in the storing unit by the splitting unit to prompt the processing units to cooperatively execute the split processes.

6. The information processing system as claimed in claim 2, wherein the plurality of executing units include a plurality of processing units that are configured to perform a predetermined process on electronic data or acquire electronic data from a predetermined data storage device; and a splitting unit that is configured to split a process execution request for a process of acquiring electronic data from the predetermined data storage device and performing the predetermined process on the acquired electronic data into a plurality of processes to be executed by the processing units including a process of acquiring the electronic data from the predetermined data storage device and a process of performing the predetermined process on the acquired electronic data, the split process execution request being stored in the storing unit by the splitting unit to prompt the processing units to cooperatively execute the split processes.

7. The information processing system as claimed in claim 2, wherein the storing unit includes a queue that stores the process execution request that is to be split into the plurality of processes to be executed by the other executing units; and a queue that stores the split process execution request for prompting the other executing units to cooperatively execute the split processes.

8. The information processing system as claimed in claim 2, wherein the data conversion process includes a process of converting dataA to dataC, and the at least one executing unit of the plurality of executing units is further configured to split the data conversion process into a plurality of data conversion processes including a process of converting dataA to dataB and a process of converting dataB to dataC, wherein each of dataA, dataB and dataC are different types of data formats.

9. The information processing system as claimed in claim 2, wherein each of the other executing units update a status of the data conversion process after a corresponding split process is completed.

10. An information processing system including at least one information processing apparatus, the information processing system comprising:

a managing unit that sorts a process execution request based on a type of process and a priority of the process execution request;

a storing unit having a memory that stores the sorted process execution request according to the type of process and the priority of the process execution request; and a plurality of executing units that are configured to execute a process corresponding to the process execution request stored in the storing unit;

wherein, upon the information processing system determining that the process corresponding to the process execution request cannot be executed by only one of the plurality of executing units, at least one executing unit of the plurality of executing units is configured to split the process corresponding to the process execution request stored in the storing unit into a plurality of processes to be executed by at least two other executing units of the plurality of executing units and store in the storing unit a split process execution request including the split processes for prompting the other executing units to cooperatively execute the split processes, wherein the process includes a data conversion process corresponding to a data process execution request, and wherein the at least one executing unit of the plurality of executing units is further configured to split the data conversion process into a plurality of data conversion processes upon determining that the process corresponding to the process execution request cannot be executed by only one of the plurality of executing units.

11. The information processing system as claimed in claim 10, wherein the storing unit stores the sorted process execution request according to the type of process and the priority of the process execution request; and the process corresponding to the stored process execution request is executed by at least one of the plurality of executing units including an executing unit that prioritizes executing a process corresponding to a process execution request having a high priority and an executing unit that prioritizes executing a process corresponding to a process execution request having a low priority.

* * * * *